United States Patent
Parks

(10) Patent No.: US 9,203,825 B2
(45) Date of Patent: Dec. 1, 2015

(54) METHOD OF AUTHENTICATING A USER OF A PERIPHERAL APPARATUS, A PERIPHERAL APPARATUS, AND A SYSTEM FOR AUTHENTICATING A USER OF A PERIPHERAL APPARATUS

(71) Applicant: Canon Europa N.V., Amstelveen (NL)

(72) Inventor: Benjamin John Parks, Reading (GB)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 14/178,374

(22) Filed: Feb. 12, 2014

(65) Prior Publication Data

US 2014/0230023 A1    Aug. 14, 2014

(30) Foreign Application Priority Data

Feb. 12, 2013    (EP) .................................... 13154974

(51) Int. Cl.
*G06F 21/41* (2013.01)
*H04L 29/06* (2006.01)
*G06F 21/60* (2013.01)

(52) U.S. Cl.
CPC ............... *H04L 63/08* (2013.01); *G06F 21/41* (2013.01); *G06F 21/608* (2013.01); *H04L 63/0815* (2013.01)

(58) Field of Classification Search
CPC ................................ G06F 21/41; G06F 21/608
See application file for complete search history.

(56) References Cited

U.S. PATENT DOCUMENTS

| | | | |
|---|---|---|---|
| 2002/0124053 A1* | 9/2002 | Adams et al. ................. | 709/216 |
| 2008/0144071 A1* | 6/2008 | Uchikawa .................... | 358/1.14 |
| 2011/0126257 A1* | 5/2011 | Goergen et al. ............... | 725/132 |
| 2011/0244798 A1* | 10/2011 | Daigle et al. ................. | 455/41.2 |
| 2012/0084135 A1* | 4/2012 | Nissan et al. ............... | 705/14.38 |
| 2012/0204233 A1* | 8/2012 | Rubio ............................. | 726/4 |
| 2012/0227098 A1* | 9/2012 | Obasanjo et al. ................. | 726/8 |
| 2012/0229838 A1 | 9/2012 | Mogaki | |
| 2013/0060889 A1* | 3/2013 | Miyazawa .................... | 709/217 |
| 2014/0070002 A1* | 3/2014 | Pineau et al. ................. | 235/382 |
| 2014/0101723 A1* | 4/2014 | Wilkes et al. ..................... | 726/4 |

(Continued)

FOREIGN PATENT DOCUMENTS

| | | |
|---|---|---|
| EP | 2 381 387 A2 | 10/2011 |
| JP | 2006031368 A | 2/2006 |
| JP | 2011193309 A | 9/2011 |
| JP | 2012113445 A | 6/2012 |
| JP | 2012155647 A | 8/2012 |
| JP | 2013009052 A | 1/2013 |

OTHER PUBLICATIONS

Epson Selected FAQ, 2015, 2 pages.*

(Continued)

*Primary Examiner* — Taghi Arani
*Assistant Examiner* — Thaddeus Plecha
(74) *Attorney, Agent, or Firm* — Canon USA Inc. IP Division

(57) ABSTRACT

A method of authenticating a user at a peripheral apparatus includes receiving a log-in request from a user, sending a request to a social networking service to authenticate the user's social networking service account, receiving the user's social networking service account information from the social networking service, determining based on the user's social networking service account information whether the user is authorised to access the peripheral apparatus, and allowing, in a case that the determining determines that the user is authorised to access the peripheral apparatus, the user access to the peripheral apparatus.

33 Claims, 24 Drawing Sheets

(56) References Cited

U.S. PATENT DOCUMENTS

2014/0108810 A1* 4/2014 Chenna .................. 713/179
2014/0115681 A1* 4/2014 Lemberg ................. 726/7

OTHER PUBLICATIONS

"xAuth." Twitter Developers, captured by Internet Archive: WayBackMachine. Rev. 1 Feb. 2013: 1-2. URL: http://web.archive.org/web/20130201200018/https://dev.twitter.com/docs/oauth/xauth, retrieved Jul. 23, 2013.

"Print server." Wikipedia, the free encyclopedia. Ed. 18 Oct. 2012: 1-2. http://en.wikipedia.org/w/index.php?title=Print_server&oldid=518450257, retrieved Jul. 24, 2013.

"QR Code Monkey." QR-CodeMonkey, captured by Internet Archive: WayBackMachine. Rev. 1 Oct. 2012: 1-2. http://web.archive.org/web/20121001044542/http://www.qrcode-monkey.com/, retrieved Jul. 23, 2013.

Tomohiro, O., et al., "Create and Learn OAuth Certification", WEB+DB Press, Jul. 25, 2011, pp. 85-115, vol. 63.

Yamazaki, "Technology of 'OAuth'", Jan. 1, 2013, p. 76-77, vol. 38, No. 1.

\* cited by examiner

FIG. 3

METHOD OF AUTHENTICATING A USER OF A PERIPHERAL APPARATUS, A PERIPHERAL APPARATUS, AND A SYSTEM FOR AUTHENTICATING A USER OF A PERIPHERAL APPARATUS

CROSS-REFERENCE TO RELATED APPLICATIONS

The present application claims priority from European Patent Application No. 13154974.3, filed on 12 Feb. 2013.

BACKGROUND

1. Field

The present subject matter relates to an authentication method, an authentication apparatus and an authentication system. In particular, the present subject matter relates to a method of authenticating a user at a peripheral apparatus, a peripheral apparatus for authenticating a user of the peripheral apparatus and a system for authenticating a user of a peripheral apparatus.

2. Description of Related Art

OAuth is an authentication protocol that allows users to approve applications to act on their behalf without sharing their credentials, e.g. password. In the traditional client-server authentication model, a client uses its credentials to access resources hosted by a server. OAuth introduces a third role to this model: the resource owner. In the OAuth model, the client (which is not the resource owner, but is acting on its behalf) requests access to resources controlled by the resource owner, but hosted by the server.

In order for the client to access resources, it first has to obtain permission from the resource owner. This permission is expressed in the form of a token and matching shared-secret. The purpose of the token is to make it unnecessary for the resource owner to share its credentials with the client. Unlike the resource owner credentials, tokens can be issued with a restricted scope and limited lifetime, and revoked independently. For further information on OAuth please refer to http://oauth.net/.

A social networking service is an online service, platform, or site that focuses on building and reflecting social networks or social relations among people, who, for example, share interests and/or activities and people with similar or somewhat similar interests, backgrounds and/or activities make their own communities. A social networking service consists of a representation of each user (often a profile), his/her social links, and a variety of additional services. Most social networking services are web-based and provide means for users to interact over the Internet, such as e-mail and instant messaging. Social networking sites allow users to share ideas, activities, events, and interests within their individual networks.

The main types of social networking services are those that contain category places (such as former school year or classmates), means to connect with friends (usually with self-description pages), and a recommendation system linked to trust. Popular methods now combine many of these, with Facebook®, Google+®, and Twitter® widely used worldwide. Twitter is an online social networking service and microblogging service that enables its users to send and read text-based posts of up to 140 characters, known as "tweets". Unregistered users can read the tweets, while registered users can post tweets through the website interface, SMS, or a range of apps for mobile devices.

In large MFP installations, Active Directory, a directory service by Microsoft® can be installed in order to control log-on of users. However, in smaller installations, installing Active Directory is expensive and inconvenient. It is desirable to provide an alternative log-on mechanism which is suitable for smaller installations of groups of MFPs.

SUMMARY

It is an object of the present subject matter to provide a peripheral apparatus and a method of a peripheral apparatus that allows authentication of users at the peripheral apparatus without the need for dedicated authentication resources in the peripheral apparatus. In other words, it is an object of the present subject matter to provide a simplified low cost mechanism for authentication of users at the peripheral apparatus.

According to a first aspect of the present subject matter there is provided a method of authenticating a user at a peripheral apparatus, comprising the peripheral apparatus: receiving a log-in request from a user; sending a request to a social networking service to authenticate the user's social networking service account; receiving the user's social networking service account information from the social networking service; determining based on the user's social networking service account information whether the user is authorised to access the peripheral apparatus; and allowing, in a case that the determining determines that the user is authorised to access the peripheral apparatus, the user access to the peripheral apparatus.

In some embodiments, the determining comprises connecting to an administrator's social networking service account to determine whether the user's social networking service account information is associated with a representation of the peripheral apparatus on the social networking service.

In some embodiments, the representation of the peripheral apparatus on the social networking service is associated with a list of members of the social networking service on the social networking service, and/or the representation of the peripheral apparatus on the social networking service is associated with a group of lists of members of the social networking service on the social networking service.

In some embodiments, associating the representation of the peripheral apparatus on the social networking service with the list of members of the social networking service comprises defining levels of access to functions of the peripheral apparatus for the list of members of the social networking service, and wherein associating the representation of the peripheral apparatus on the social networking service with the group of lists of members of the social networking service comprises defining levels of access to functions of the peripheral apparatus for the group of lists of members of the social networking service.

In some embodiments, the sending of the request to the social networking service comprises requesting an access token from the social networking service. In some embodiments, the determining comprises using the access token to obtain the user's social networking service username and determining whether the username is associated with the representation of the peripheral apparatus on the social networking service. In some embodiments, the method further comprises storing the access token on the peripheral apparatus in association with information identifying the user. In some embodiments, the storing comprises storing the access token in association with an RFID of the user. Preferably, the stored access token is for making repeated log-in requests on behalf of the user.

In some embodiments, the requesting of the access token from the social networking service comprises using an OAuth or a xAuth authentication process.

In some embodiments, the sending of the request to the social networking service is preceded by a mobile device determining a first piece of information provided by the peripheral apparatus.

In some embodiments, the first piece of information is a URL, the peripheral apparatus provides the URL to the user, and the mobile device determines the URL by entry of the URL into the mobile device by the user. In some embodiments, the URL received by the mobile device allows a user to log-in to the social networking service. In some embodiments, the URL received by the mobile device allows a user to log-in to the social networking service and authorise issue of an access token to the peripheral apparatus.

In other embodiments, the peripheral apparatus provides a machine-readable code encoding the first piece of information, and the mobile device determines the first piece of information by reading and decoding the machine-readable code provided by the peripheral apparatus.

In some embodiments, the sending of the request to the social networking service to authenticate the user is followed by the mobile device determining a second piece of information provided by the social networking service. In some embodiments, the second piece of information is a code and the method comprises the peripheral apparatus receiving the code from the user via a user interface of the peripheral apparatus. In some embodiments the code is a number.

In other embodiments, the machine-readable code is a bar code or other machine-readable code encoding the piece of identification information; and the mobile device is configured to determine the piece of identification information by reading and decoding the barcode or other machine-readable code provided by the peripheral device.

According to another aspect of the present subject matter there is provided a peripheral apparatus configured to: receive a log-in request from a user; send a request to a social networking service to authenticate the user's social networking service account; receive the user's social networking service account information from the social networking service; determine based on the user's social networking service account information whether the user is authorised to access the peripheral apparatus; and allow, in a case that the peripheral apparatus determines that the user is authorised to access the peripheral apparatus, the user access to the peripheral apparatus.

In some embodiments, the peripheral apparatus comprises a peripheral device which functions as at least one of a printer, a fax machine, or a scanner.

According to a further aspect of the present subject matter there is provided a mobile device comprising a function for authenticating a user at a peripheral apparatus, the function including: means for reading and decoding a machine readable code in order to determine a piece of identification information; and means for using the determined piece of identification to allow a user to log-in to a social networking service in order to authorise issue of an access token to the peripheral apparatus.

In some embodiments, the mobile device is a mobile phone, a PDA, a digital camera, a laptop computer, or other mobile device.

According to a further aspect of the present subject matter there is provided a system for authenticating a user of a peripheral apparatus, the system comprising: a peripheral apparatus configured to receive a log-in request from a user and to send a request to a social networking service to authenticate the user's social networking service account; and a social networking service configured to receive the request and to send the user's social networking service account information to the peripheral apparatus. The peripheral apparatus is configured to receive the user's social networking service account information from the social networking service, determine based on the user's social networking service account information whether the user is authorised to access the peripheral apparatus, and allow, in a case that the peripheral apparatus determines that the user is authorised to access the peripheral apparatus, the user access to the peripheral apparatus.

According to a further aspect of the present subject matter there is provided a method of authenticating a user at a peripheral apparatus comprising: a mobile device determining a first piece of identification information and sending an access request to the peripheral apparatus via a social networking service, the access request comprising the determined first piece of identification information and a second piece of information identifying the user's social service networking account; the peripheral apparatus receiving the access request via the social networking service and determining based on the access request information whether the user is authorised to access the peripheral apparatus; and in a case that the peripheral apparatus determines that the user is authorised to access the peripheral apparatus, the peripheral apparatus allowing the user access to the peripheral apparatus.

In some embodiments, the determining by the peripheral apparatus is preceded by the peripheral apparatus connecting to an administrator's social networking service account and registering the first piece of identification information in association with a representation of the peripheral apparatus on the social networking service. The determining by the peripheral apparatus comprises: connecting to the administrator's social networking service account, accessing the access request, and determining whether the information in the access request corresponds to the registered details of the peripheral apparatus.

In some embodiments, the access request is a direct (private) message sent from the user's social networking service account to the administrator's social networking service account.

In some embodiments, the peripheral apparatus determines the level of access to the peripheral apparatus based on the second piece of information identifying the user's social networking service account.

In some embodiments, the first piece of identification information comprises a code, the peripheral apparatus provides the code to a user, and the mobile device determines the first piece of identification information by entry of the code into the mobile device by the user.

In other embodiments, the peripheral apparatus provides a machine-readable code encoding the first piece of identification information; and the mobile device determines the first piece of identification information by reading and decoding the machine-readable code provided by the peripheral apparatus.

In some embodiments, the first piece of identification information comprises a random number.

In some embodiments, the first piece of identification information comprises a piece of information identifying an administrator's social networking service account (e.g. username).

In some embodiments, the peripheral apparatus is configured to generate the first piece of identification information.

In some embodiments, the first piece of identification information is derivable from a position of the peripheral apparatus; and the mobile device determines the first piece of identification information by detecting a position of the peripheral apparatus. Preferably, the position of the peripheral apparatus is determined using a position detection means in the mobile device. In some embodiments the position detection means is a global positioning sensor. Preferably the first piece of identification information is a predetermined number of digits of location coordinates of the peripheral apparatus.

According to a further aspect of the present subject matter there is provided a system for authenticating a user at a peripheral apparatus, the system comprising: a mobile device configured to determine a first piece of identification information and to send an access request to the peripheral apparatus via a social networking service, the access request comprising the determined first piece of identification information and a second piece of information identifying the user's social service networking account; the peripheral apparatus configured to receive the access request and to determine based on the access request information whether the user is authorised to access the peripheral apparatus. The peripheral apparatus is configured, in a case that the peripheral apparatus determines that the user is authorised to access the peripheral apparatus, to allow the user access to the peripheral apparatus.

According to a further aspect of the present subject matter there is provided a mobile device comprising a function for authenticating a user at a peripheral apparatus, the function including: means for reading and decoding a machine readable code in order to determine a first piece of identification information; and means for sending an access request to the peripheral apparatus via a social networking service, the access request comprising the determined first piece of identification information and a second piece of information identifying the user's social networking service account.

According to a further aspect of the present subject matter there is provided a peripheral apparatus comprising: means configured to provide a user with a first piece of identification information in the form of a machine-readable code means; and means configured to access a social networking service account and to determine based on the first piece of identification information whether the user is authorised to access the peripheral apparatus.

In some embodiments, the means configured to provide the first piece of identification information is configured to provide the identification information to a user by at least one of: displaying the identification information on a display of the peripheral apparatus, and printing the identification information.

In some embodiments, the identification information comprises a random number.

In some embodiments, the identification information comprises a piece of information identifying an administrator's social networking service account.

In some embodiments, the peripheral apparatus comprises means for generating the identification information.

In some embodiments, the peripheral apparatus is configured to provide the identification information in the form of a barcode or a QR code.

According to a further aspect of the present subject matter there is provided a method of communicating information concerning a peripheral apparatus comprising the peripheral apparatus: connecting to a social networking service account representing the peripheral apparatus; and sending information concerning the peripheral apparatus to one or more users of the social networking service.

In some embodiments, the information sent by the peripheral apparatus is information concerning one of more of the following: information concerning the status of the peripheral apparatus, information concerning the usage of the peripheral apparatus, information concerning the location of the peripheral apparatus, information identifying users of the peripheral apparatus, information concerning overall or individual user activity of the peripheral apparatus, information concerning user actions performed using the peripheral apparatus, information detailing costs to the user for using the peripheral apparatus, information detailing materials used by the peripheral apparatus to process user actions, and information concerning servicing of the peripheral apparatus.

According to a further aspect of the present subject matter there is provided a peripheral apparatus for communicating information concerning the peripheral apparatus comprising: means for connecting to a social networking service account representing the peripheral apparatus; and means for sending information concerning the peripheral apparatus to one or more users of the social networking service.

In some embodiments, the peripheral apparatus comprises a peripheral device which functions as at least one of a printer, a fax machine, or a scanner.

In some embodiments, the mobile device is a mobile phone, a PDA, a digital camera, a laptop computer, or other mobile device.

BRIEF DESCRIPTION OF THE DRAWINGS

Embodiments of the present subject matter will now be described, by way of example only, with reference to the accompanying figures in which:

FIG. 3 shows an administrator's Twitter account;

DETAILED DESCRIPTION

First Example Embodiment

Figure 1:
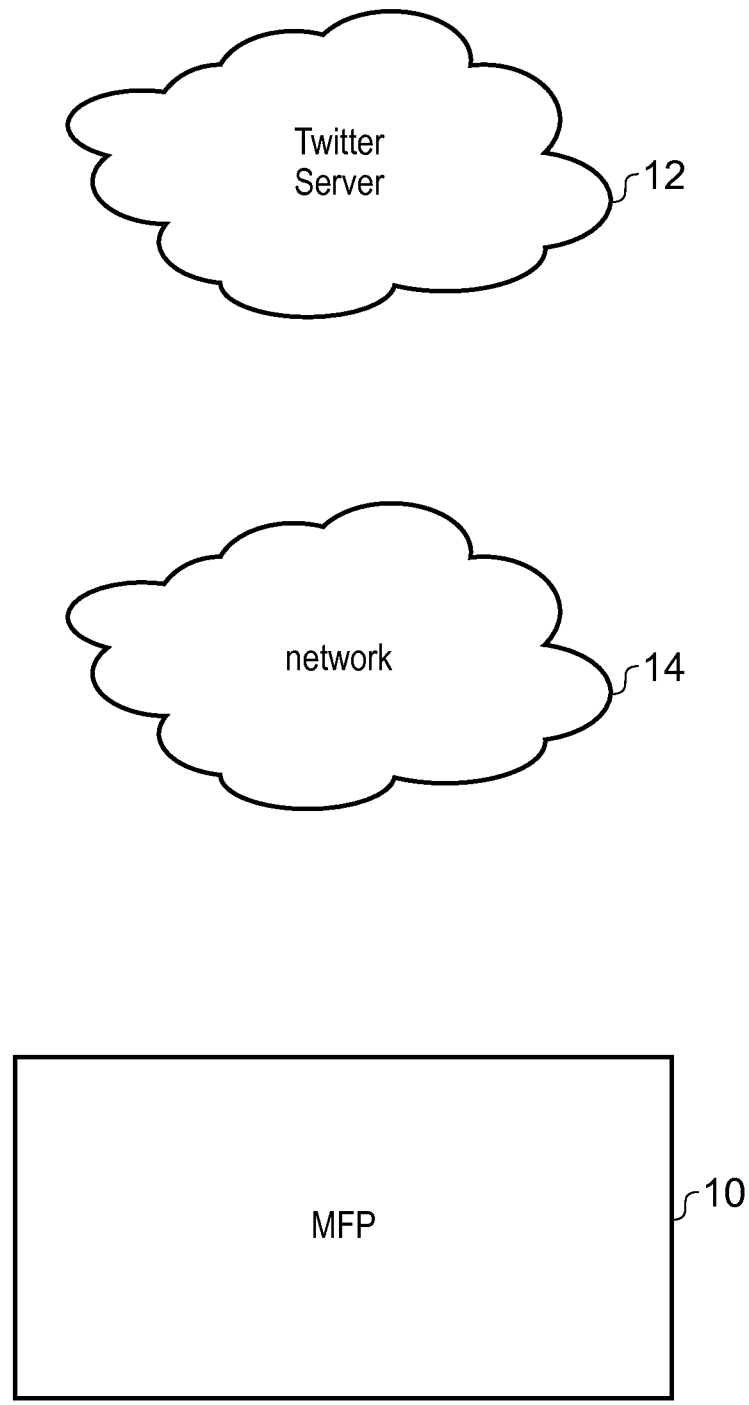
FIG. 1 shows a configuration of the first example embodiment.

FIG. 1 shows architecture of an image-processing system of the first example embodiment. The image-processing system comprises an MFP (multi-function peripheral) 10 and an authentication server 12. The MFP 10 is able to connect to the internet via a local area network such as a Wi-Fi network 14 so as to access the Twitter API hosted by the authentication server 12.

Figure 2:
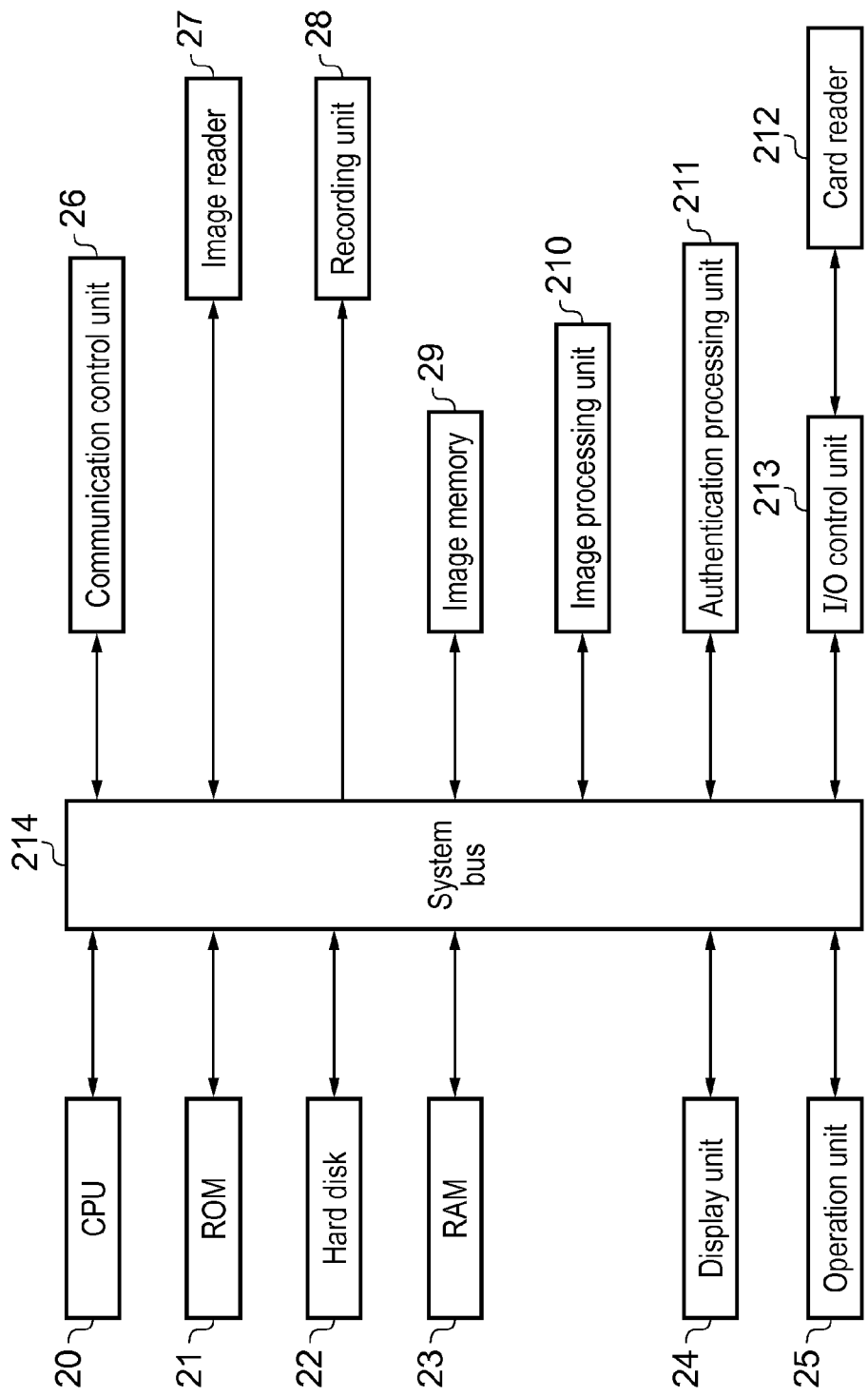
FIG. 2 shows hardware of an MFP.

FIG. 2 shows the hardware configuration of the MFP 10. The MFP comprises a CPU 20, a ROM 21, a hard disk drive 22, and a RAM 23. These components are standard hardware components for computers and other devices and perform their usual functions. The MFP 10 further comprises a display unit 24, an operation unit 25, a communication control unit 26, an image reader 27, a recording unit 28, an image memory 29, an image processing unit 210, an authentication unit 211, a card reader 212, and an I/O control unit 213. The display unit 24 is a touch-screen LCD display provided on the MFP 10 to allow a user to make selections and view information on the MFP 10. The operation unit 25 is a keypad and other buttons to allow a user to enter authentication credentials, settings and other information to the MFP 10. The communication control unit 26 is provided to allow the MFP 10 to communicate over a LAN with a web server 12. The image reader 27 is a scanner that allows scanning of documents. The recording unit 28, shown in FIG. 2, represents parts of the MFP 10 dedicated to printing. The recording unit 28 functions to print image data onto a recording medium and output the recording medium for collection by a user. The image memory 29 is a memory provided for storage of image data during scanning by the image reader 27 or printing by the recording unit 28. The image-processing unit 210 represents various application specific integrated circuits (ASIC) provided in the MFP 10 in order to increase the speed of certain image processing operations, such as conversion of scanned R,G,B data into C,M,Y,K data during a copying operation. The authentication processing unit 211 is provided in order to authenticate user details received from the card reader 212. Data from the card reader 212 is received at the authentication unit 211 via an I/O control unit 213. The authentication unit may be implemented by software run using the CPU 20 and RAM 23 rather than as a separate hardware component. The components described above are interconnected via a system bus 214.

The MFP 10 runs an operating system. In this particular embodiment the operating system runs a MEAP (multi-functional embedded application platform) application (login application) which is a run time environment provided on MFP devices sold by Canon®. The operating system allows the running of JAVA applications and may also include a web interface as will be explained later. These applications can then control the operation of the peripheral device, and can display information, and receive input instructions from a user, via the operation unit 25 and the touch sensitive display unit 24.

Operation of the image-processing system will now be described with reference to FIGS. 3 to 7. As will be described in more detail below, in embodiments of the subject matter, an administrator uses a Service Provider (e.g. a particular social networking service such as Twitter) to manage access to peripherals such as the MFP 10.

Set Up of List on Service Provider

For example, the administrator uses an administrator Twitter account to create MFP lists in Twitter in order to control access by certain registered Twitter users to particular MFPs. Each MFP can be represented by a Twitter list. For example, users with access to the MFP 10 will be included on the Twitter list representing the MFP 10. Alternatively, to make controlling access to respective MFPs more flexible, the administrator could create lists of users in logical groups (like one would do in Active Directory (AD)), e.g. the groups could be created in Twitter. The above access control scheme could be implemented by maintaining permissions for the groups (or twitter lists) locally on the MFP 10, i.e. the MFP 10 (MEAP application) could be configured by the administrator to check particular groups—the information regarding which groups to check does not need to be stored in the Administrators Twitter account, but can instead be stored locally on the MFP 10. An access management system (AMS) can then be used to provide different kinds/levels of access to respective functions/features of the respective MFPs to different groups of users. For example, Group1 can Copy and Fax, but Group2 can only Copy.

The Administrator is able to grant/deny a user access to the MFP 10 by adding/removing the user from the Twitter list for the MFP 10.

Figure 3:
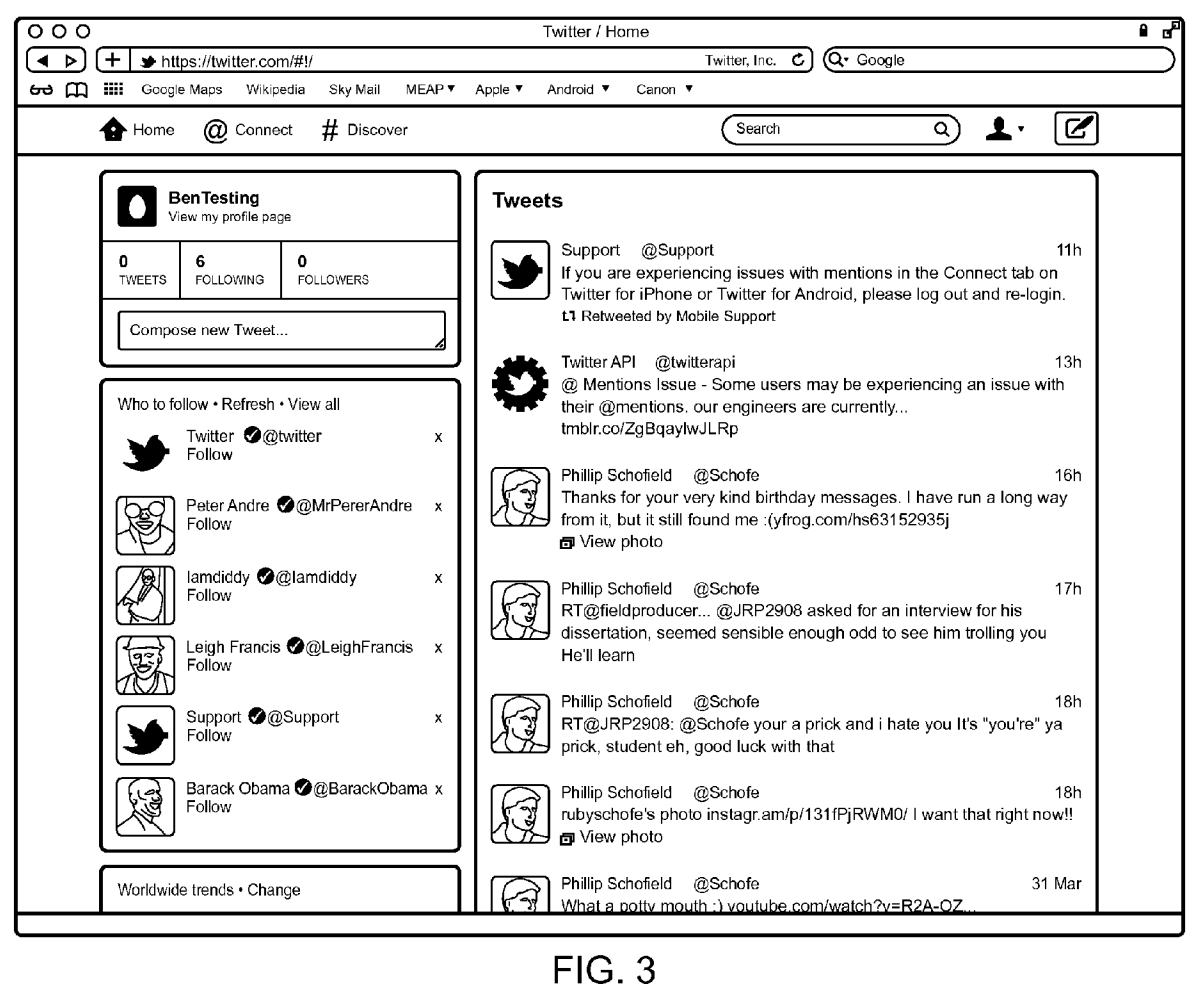
Figure 4:
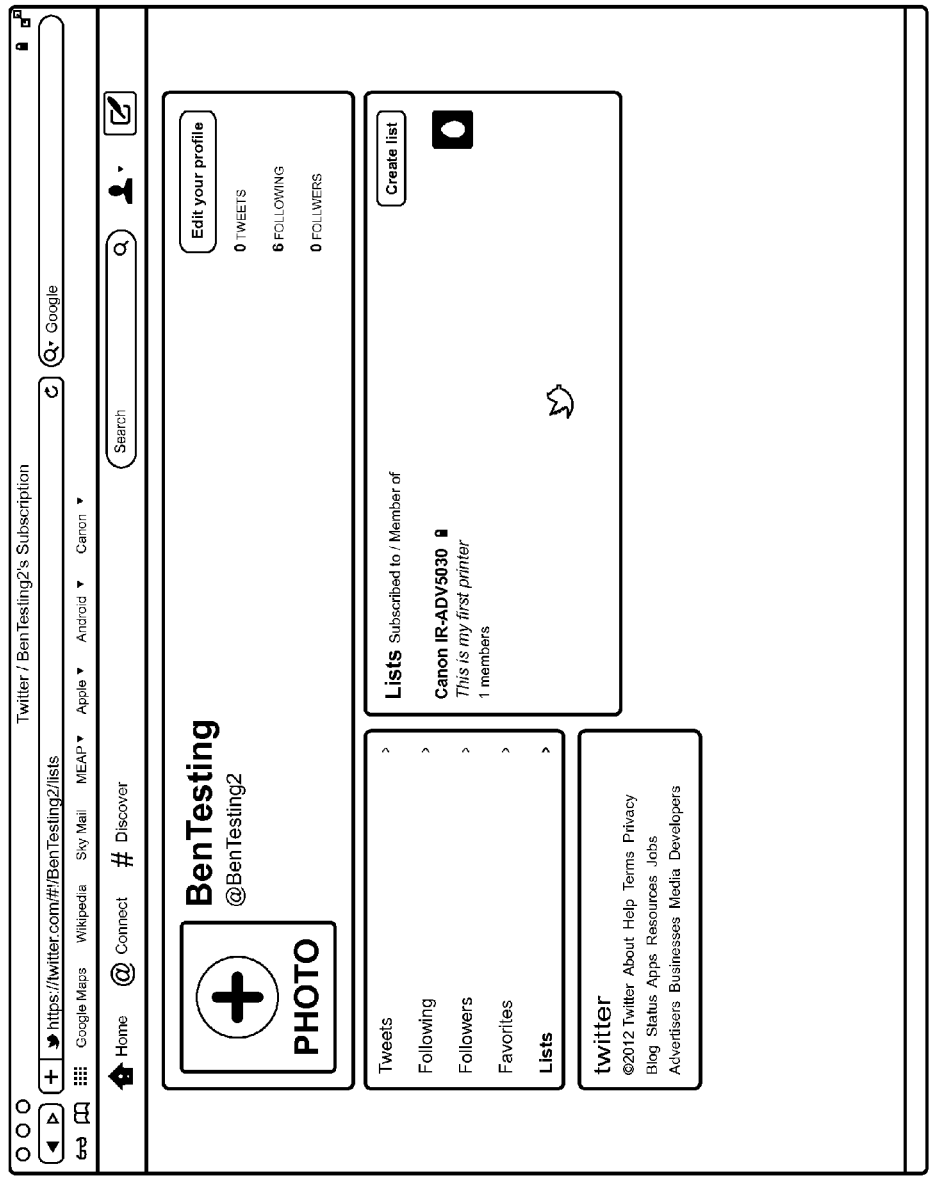
FIG. 4 shows an MFP list in Twitter.
Figure 5:
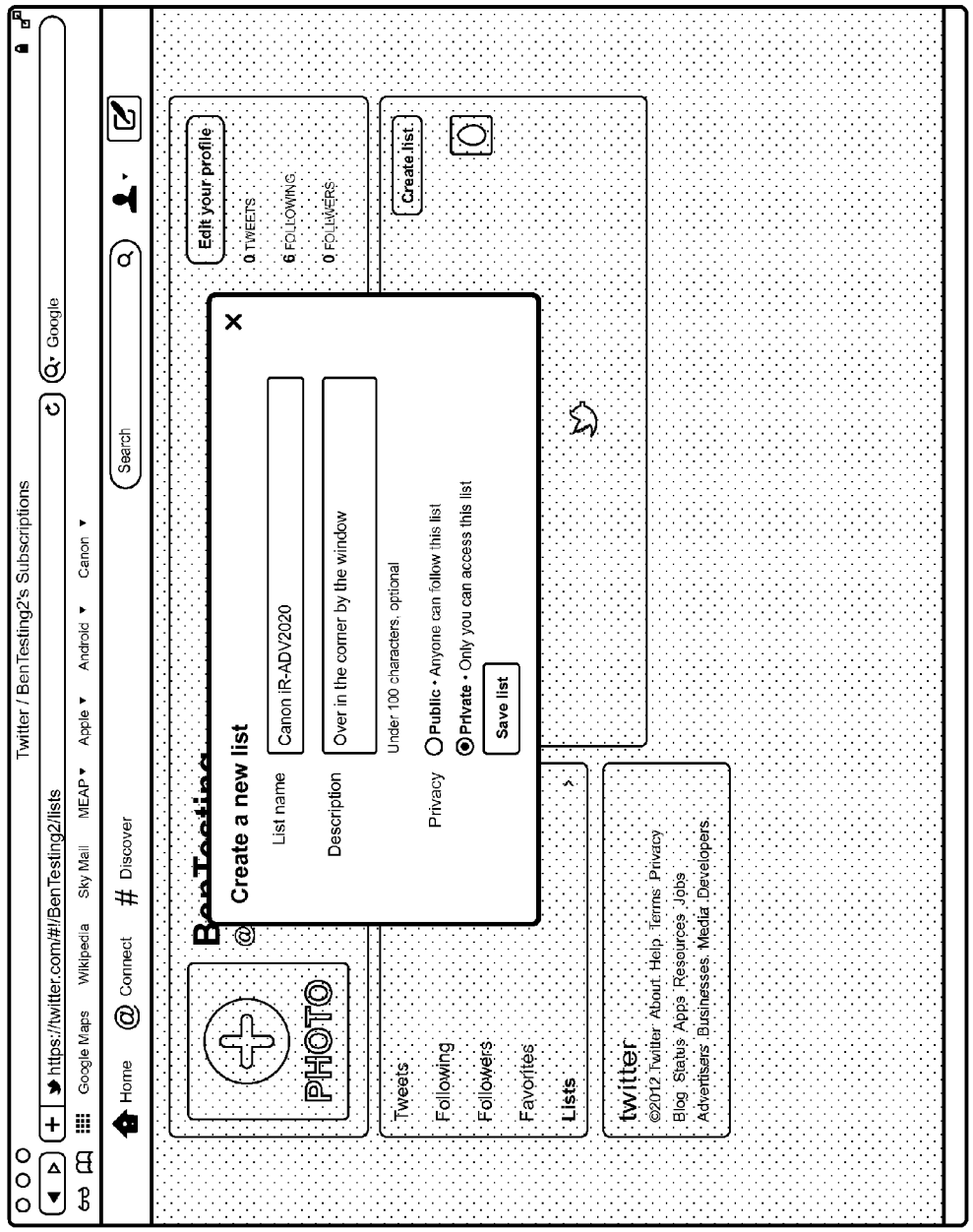
FIG. 5 shows creation of an MFP list in Twitter.
Figure 6:
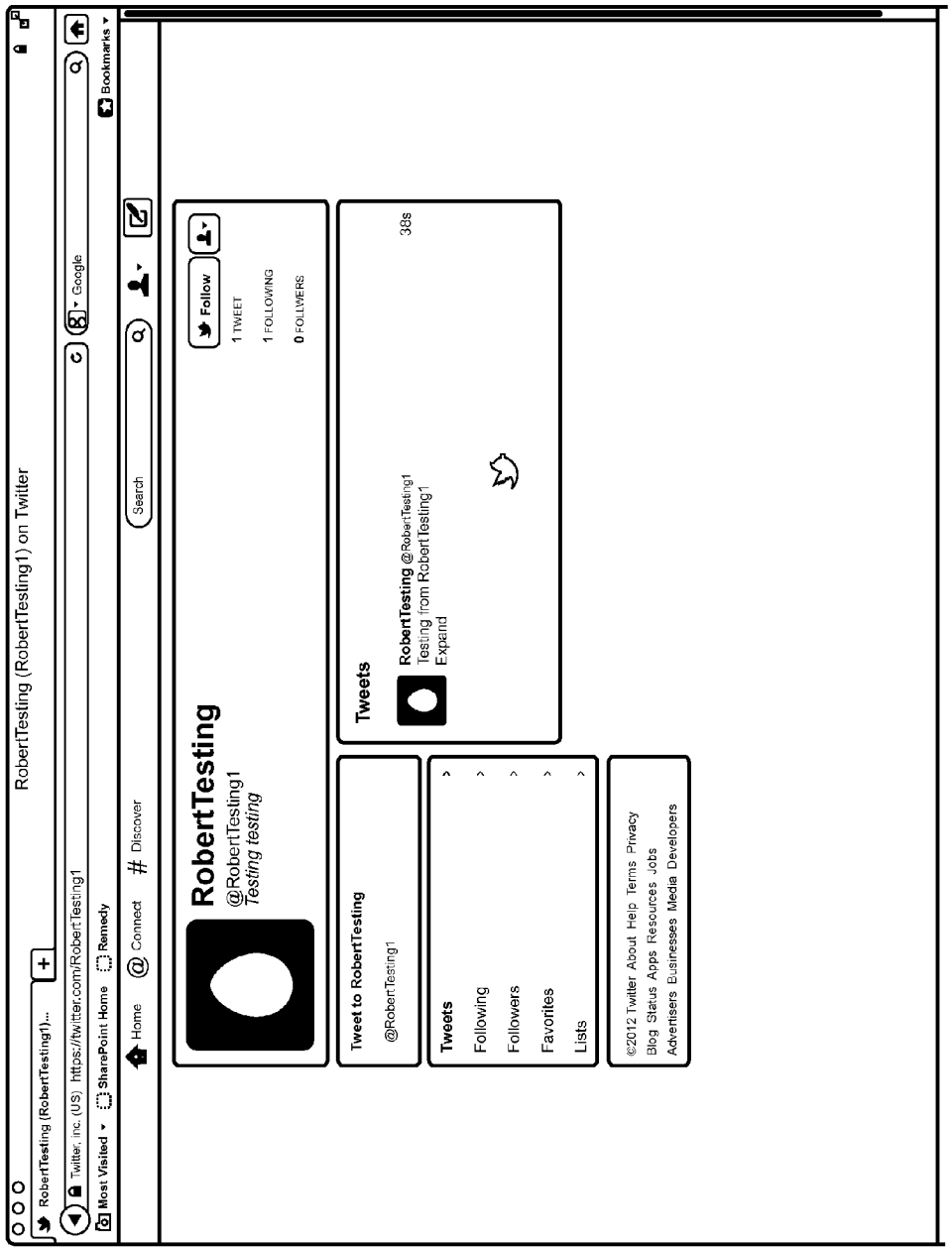
FIG. 6 shows selecting a Twitter user to be added to an MFP list.
Figure 7:
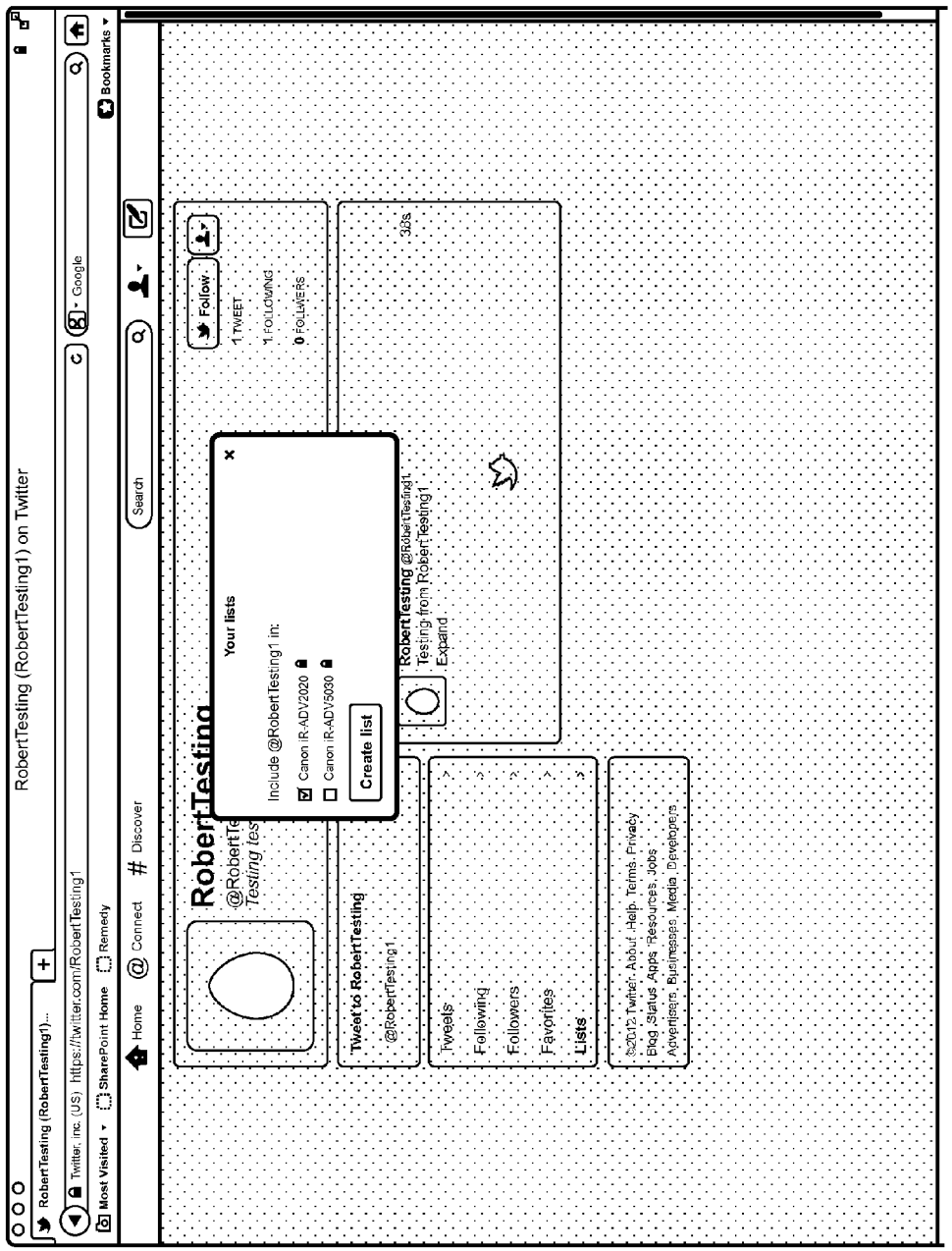
FIG. 7 shows adding the Twitter user to the MFP list created in FIG. 5.

Once the administrator (e.g. with the Twitter user ID @BenTesting 2) has logged into the administrator Twitter account, the home page shown in FIG. 3 is displayed. To create a printer list, the administrator selects 'Lists' from the profile menu (top left) which will cause the page shown in FIG. 4 to be displayed. As can be seen in FIG. 4, one printer list (Canon iR-ADV5030) has already been created. As illustrated in FIG. 5, to create a new list, the administrator clicks 'Create List', enters the name of the printer (Canon iR-ADV2020) and a description (e.g. "Over in the corner by the window") and clicks 'Save List'. As illustrated by FIGS. 6 and 7, a new user can be added to a particular printer list by searching for the user in Twitter. FIG. 6 illustrates giving RobertTesting access to a printer by selecting 'Add or remove from lists' next to the user's account name. FIG. 7 illustrates selecting which printer to grant the user access to. In the particular example shown in FIG. 7, the user is granted access to Canon iR-ADV2020.

General Log-in Procedure

Figure 8:
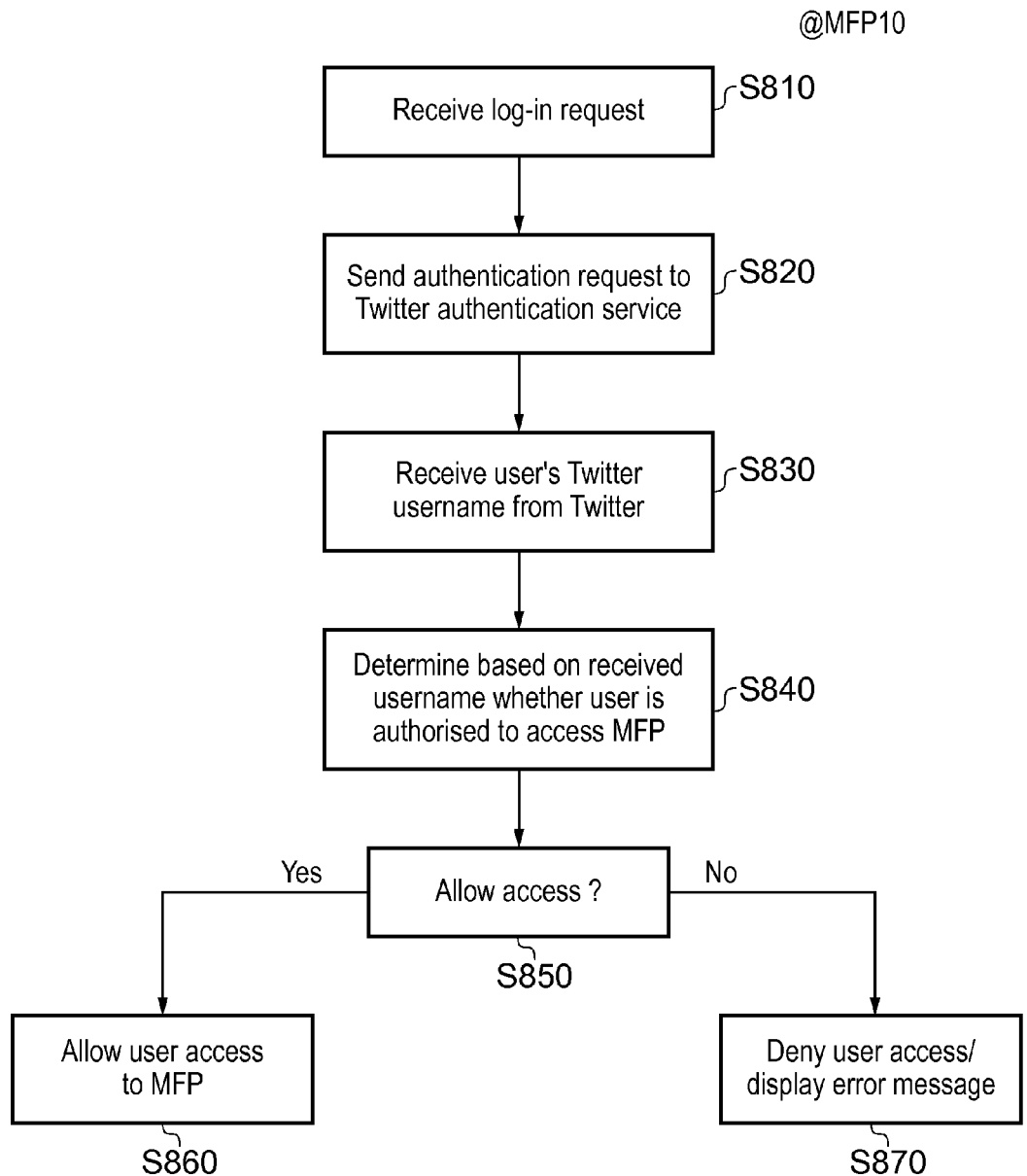
FIG. 8 shows an example general log-in procedure at the MFP.

With reference to FIG. 8, at the MFP 10, a user enters their log-in details via a log-in screen (S810 in FIG. 8). As will be described in detail below, in the first example embodiment, a web browser is used to directly access a Service Provider's server in order to allow the user to keep his/her username and password private and not share them with the MEAP application or any other site; whereas in the second example embodiment described later, the user enters his/her credentials directly into the MEAP application and the MEAP application then passes these credentials to the Service Provider. In S820 of FIG. 8, the MEAP application requests an access token from the Service Provider. In S830 of FIG. 8, the MEAP application receives the access token from the Service Provider. In S840 of FIG. 8, the MFP list for the MFP 10 defined in the Service Provider (e.g. Twitter) by the administrator (as previously described with reference to FIGS. 3 to 7) is accessed and it is determined whether the user's Service Provider ID (Twitter ID/username) is on the MFP list representing the MFP 10 which the user wishes to access (S850). If the user's Twitter ID is on the list then the user is granted access to the MFP (S860 in FIG. 8). If the user's Twitter ID is not on the list then an error message may be displayed on the MFP 10 (S870 in FIG. 8).

Detailed Log-in Procedure

Figure 9:
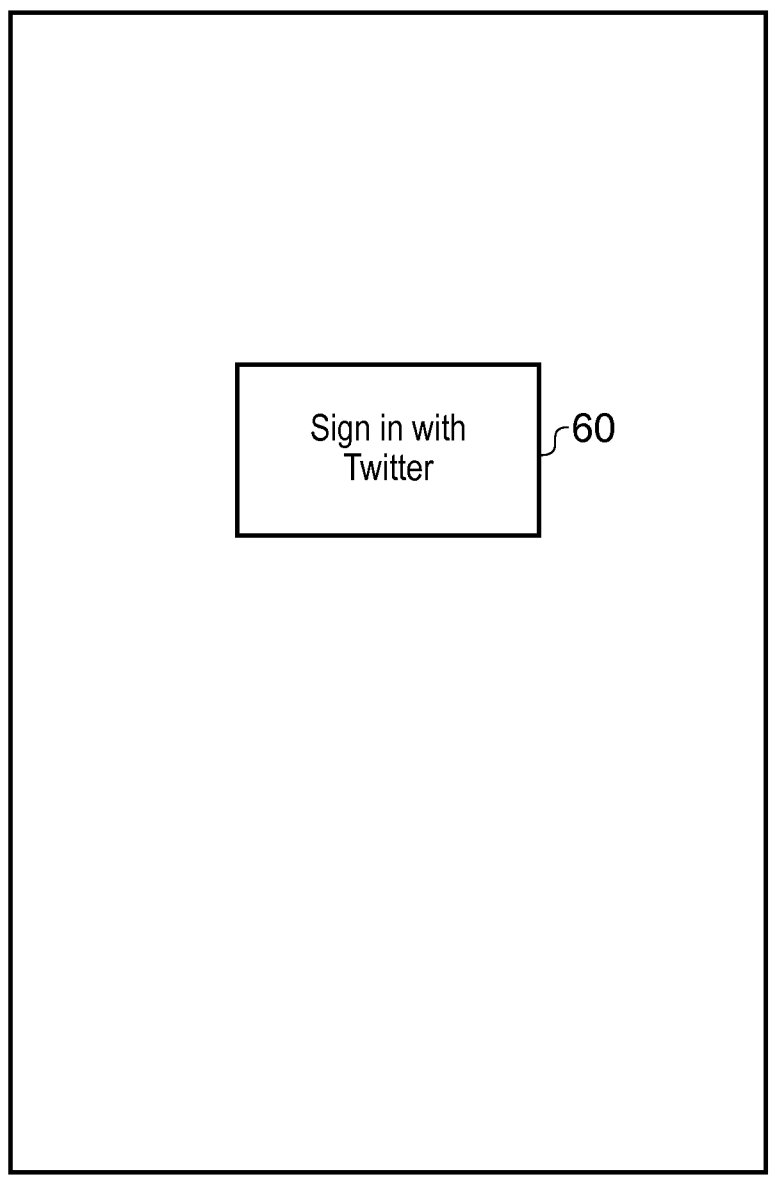
FIG. 9 shows a display of the MFP.
Figure 10:
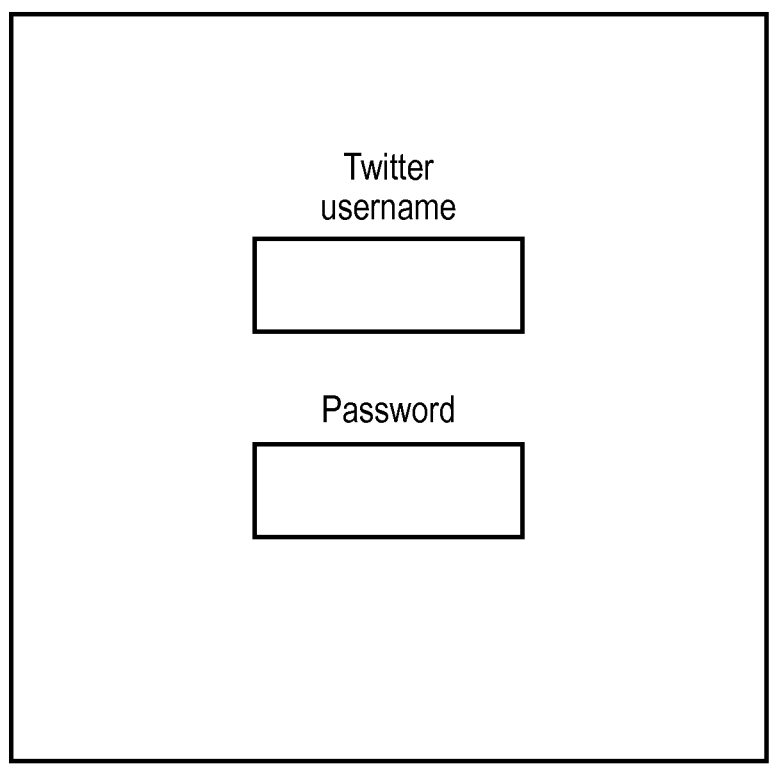
FIG. 10 shows another display of the MFP.
Figure 11:
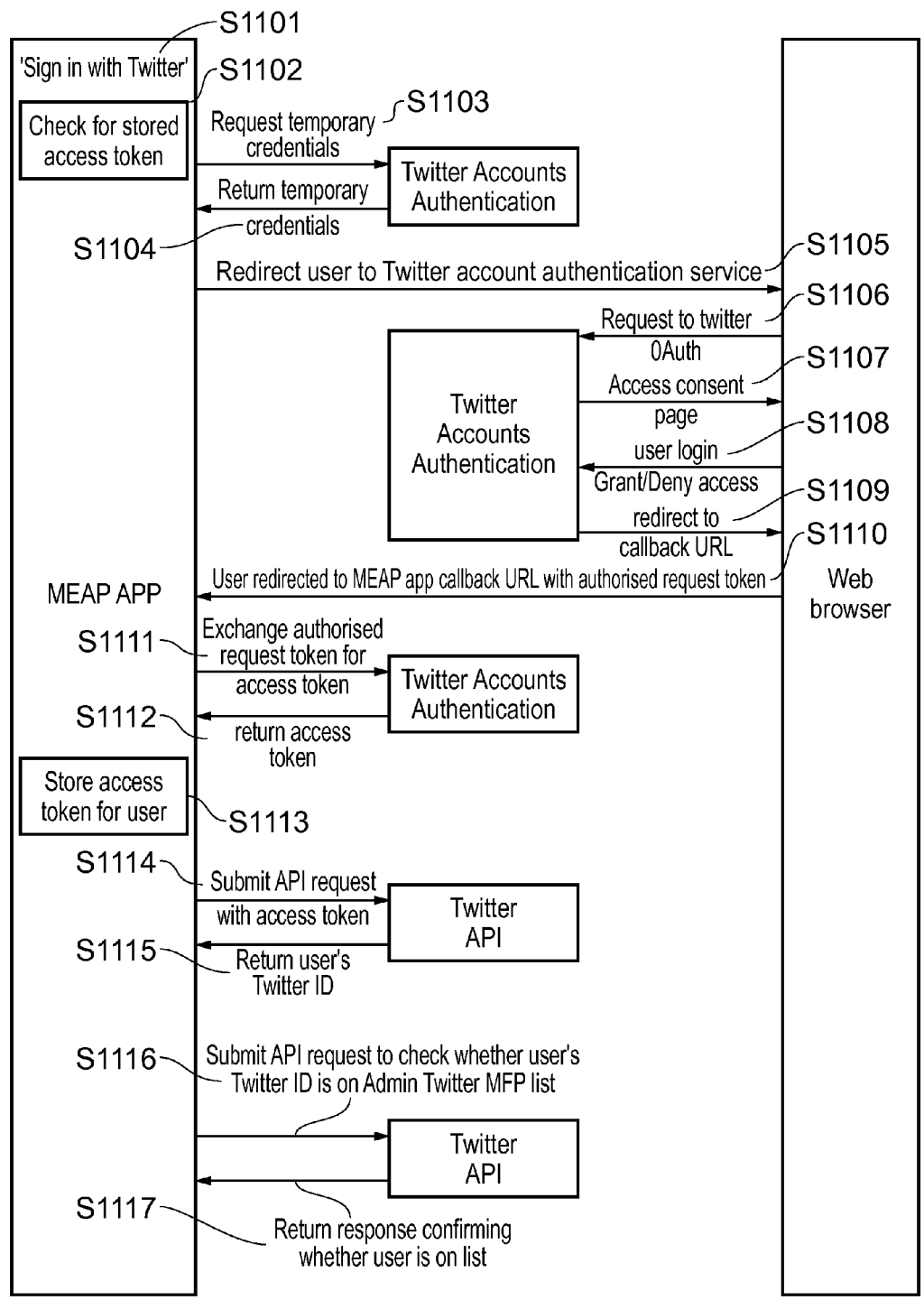
FIG. 11 shows a process performed at the MFP according to the first example embodiment.

With reference to FIGS. 9 to 11, for purposes of illustration imagine a scenario in which a user walks up to the MFP 10 and wishes to access the MFP 10. When the user looks at the display unit 24 of the MFP 10, he or she sees a display corresponding to FIG. 9. The user uses the touch screen of the display unit 24 in order to select the 'Sign in with Twitter' icon 60. Touching the icon 60 on the touch screen causes the MEAP application, which is the login application, to change state in order to display a login screen, S1101 in FIG. 11.

The MEAP application is configured to allow log-in using one or more social networking services (e.g. Twitter). In order to do so, the MEAP application previously obtained a set of client credentials (client identifier and secret) from Twitter to be used with Twitter's OAuth-enabled API.

In S1102 of FIG. 11, the MEAP application determines whether it has an OAuth access token stored for the user. If it does have an access token, the MEAP application skips ahead to S1114. If it does not have an access token, the MEAP applications proceeds to S1103.

In S1103 in FIG. 11, the MEAP application submits a signed request to obtain an unauthorised request token from Twitter's OAuth authentication service. At this point, the unauthorised request token will not be resource-owner-specific, and can be used by the MEAP application to gain resource owner approval from the user to access his/her Twitter account.

In S1104 of FIG. 11, Twitter's OAuth authentication service responds to the MEAP request with the unauthorised request token. In S1105 of FIG. 11, when the MEAP application receives the unauthorised request token, it redirects the user to Twitter's OAuth User Authorization URL (FIG. 10) with the unauthorised request token to prompt the user to log-in and authorise the token. The redirect URL identifies the unauthorised request token and a callback URL for requesting Twitter to redirect the user back to the MEAP application once approval has been granted to the MEAP application.

In S1106 of FIG. 11, the browser on the MFP 10 manages the redirect by sending a request to Twitter's OAuth log-in page. In S1107 of FIG. 11, the user is redirected to the particular Twitter URL (FIG. 10) and is requested to sign into the site. OAuth requires that Twitter first authenticates the resource owner, and then requests the user (resource owner) to grant access (e.g. via an Access request page) to the MFP.

The user can confirm that he/she is now at a Twitter web page by looking at the browser URL (FIG. 10), and can enter his/her Twitter username and password, as in S1107 and S1108 in FIG. 11.

The use of the web browser to directly access the Twitter server allows the user to keep his/her username and password private and not share them with the MEAP application or any other site. At no time does the user enter his/her credentials into the MEAP application.

At the time of logging into Twitter or after successfully logging into Twitter, the user is asked to grant access to the MEAP application, the client. Twitter informs the user of who is requesting access (in this case the MEAP application) and the type of access being granted. The user may approve or deny access, see S1108 in FIG. 11.

Once the user approves the request and if the entered credentials are valid, Twitter identifies (marks) the request token (temporary credentials) as resource-owner-authorized by the user, see S1108 in FIG. 11. If the user grants access, the Twitter's OAuth Authentication service redirects the user back to the callback URL that the MEAP application included in the URL in S1106 (S1109 in FIG. 11). The user could also deny account access, in which case the OAuth authentication service would display a page which links back to the MEAP application. In S1110 of FIG. 11, the user's browser manages the redirect and sends a request to the callback URL. The redirect URL contains an authorized request token value. Thus the browser is redirected back to the MEAP application together with the temporary credentials identifier (Authorized Request Token).

In S1111, the MEAP application submits a signed request to Twitter's OAuth authentication service to exchange the request token for an access token. In S1112, Twitter's OAuth Authentication service responds to the request from the MEAP application with an access token. Request Tokens are only good for obtaining User approval, while Access Tokens are used to access Protected Resources, in this case the user's Twitter ID (e.g. Twitter account username). In the first request, the MEAP application exchanges the Request Token for an Access Token by submitting a signed request to Twitter's authentication service, S1111, S1112. The obtained access token which is associated with a particular user may be stored (S1113 in FIG. 11) so that, in the future, the MEAP application may use the same access token to make authenticated requests for the same user, (for example, an RFID for the user may be stored at the MFP 10 in association with a previously obtained access token as is explained in more detail in the fourth example embodiment). In S1114, the MEAP application submits an API request using the access token to authenticate the request. In particular, in the second (can be multiple requests) signed request, the MEAP application obtains the user's Twitter ID from Twitter's API, see S1115 in FIG. 11. At the same time, the MFP list for the MFP 10 defined in Twitter by the administrator (as previously described with reference to FIGS. 3 to 7) is accessed and it is determined whether the user's Twitter ID is on the MFP list representing the MFP 10 which the user wishes to access, see S1116 and S1117 in FIG. 11. The MFP 10 may directly access the administrator Twitter account as the MEAP application stores and enters the administrator's username and password. Alternatively, the administrator's username/password does not need to be stored. In this case, the administrator logs in using OAuth via servlet (a web user interface) at configuration time. The access and refresh tokens for this account are then stored locally. When the access token expires (unlikely to happen in Twitter) the refresh token can be used to re-authenticate. The administrator's access token is then used to access the administrator's Twitter account and in turn the MFP lists defined by the administrator in Twitter. If the user's Twitter ID is on the list then the user is granted access to the MFP. If the user's Twitter ID is not on the list then an error message may be displayed on the MFP 10.

Second Example Embodiment

The description of the "SET UP OF LIST ON SERVICE PROVIDER" described above in relation to FIGS. 3 to 7 and the "GENERAL LOG-IN PROCEDURE" described above in relation to FIG. 8 is also applicable to this embodiment and therefore this description will not be repeated below for the second example embodiment.

xAuth Based Log-In

Figure 12:
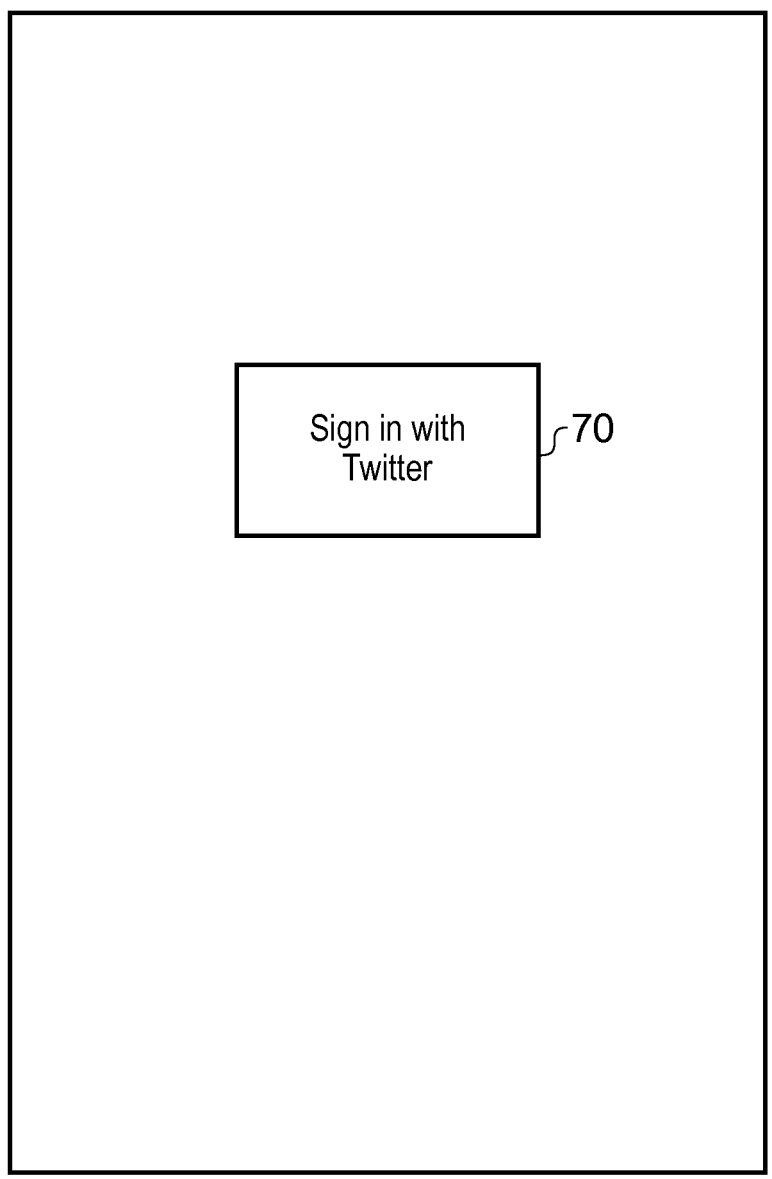
FIG. 12 shows another display of the MFP.
Figure 13:
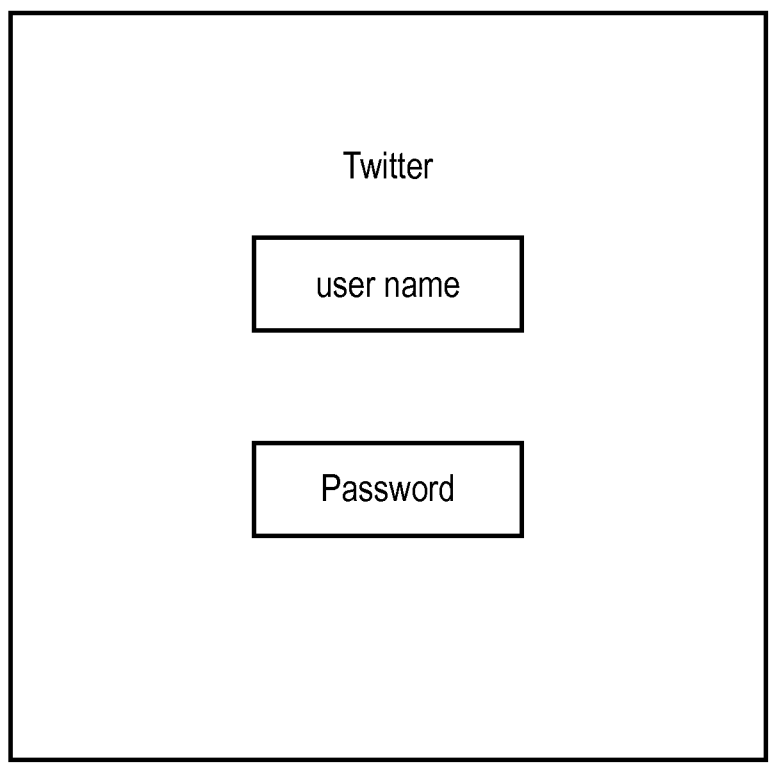
FIG. 13 shows another display of the MFP.
Figure 14:
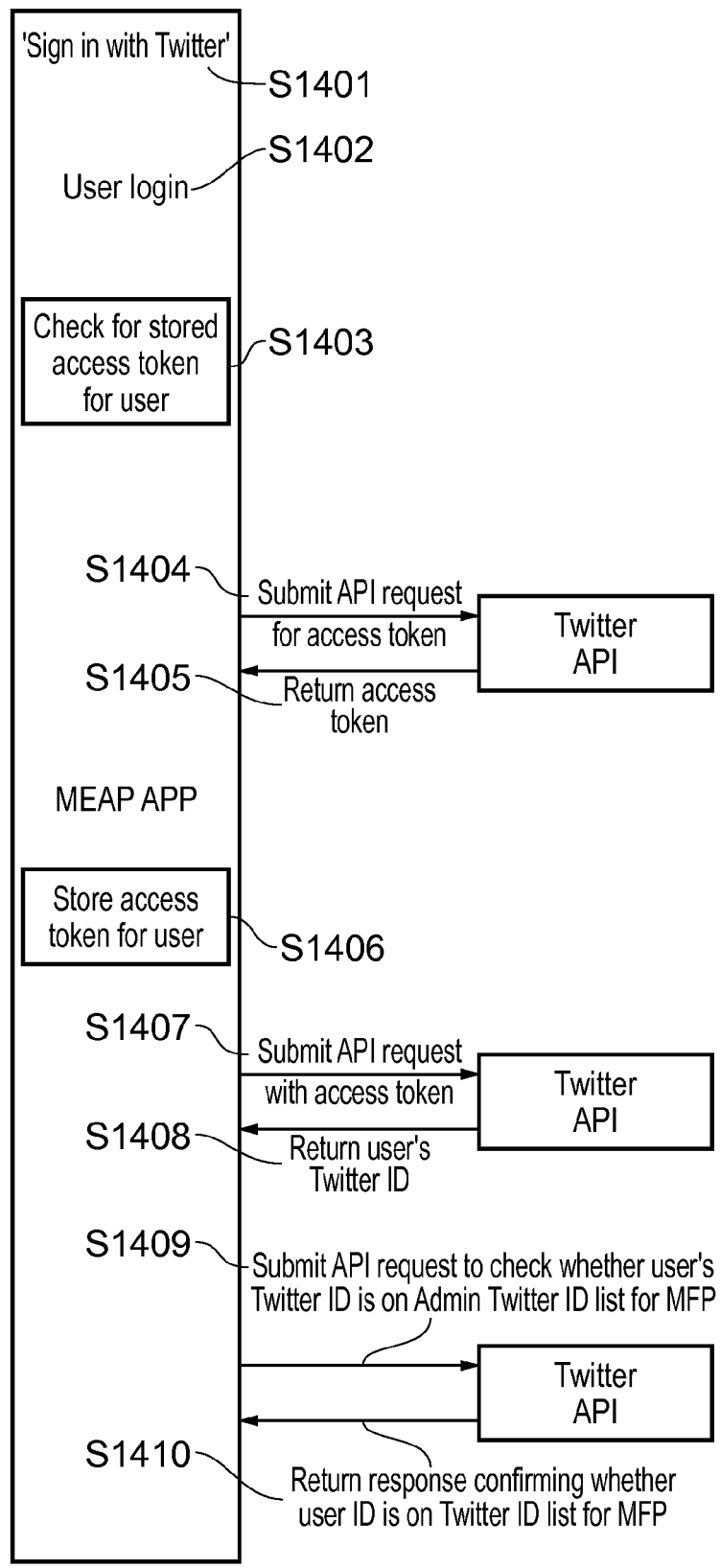
FIG. 14 shows a process performed at the MFP according to the second example embodiment.

An alternative arrangement to that shown in FIGS. 9 to 11 will now be described with reference to FIGS. 12 to 14. The OAuth specification 1.0 is a protocol that enables websites or applications to access protected web resources via an API, without requiring users to disclose their credentials. FIGS. 12 to 14 illustrate a technique for allowing a user to provide their credentials in cases where HTTP redirection to a browser is unavailable or unsuitable, such as when the MEAP application running on the MFP 10 does not have any mechanism to invoke a web browser. This embodiment implements a version of OAuth called xAuth (due to the x_auth headers that it uses). This version of OAuth uses a different flow to the traditional OAuth experience that requires a round-trip to the browser as described in relation to FIGS. 9 to 11.

The xAuth extension to OAuth allows clients (e.g. MEAP application) to obtain a user's credentials and then exchange those for an OAuth access token without a trip to the browser. xAuth is suitable for desktop and mobile applications which run in a trusted context (as opposed to web applications that do not).

xAuth is still part of the OAuth protocol. It is still necessary to send signed requests to the particular service provider (e.g. Twitter).

The xAuth process will only yield read-only or read-write access tokens. Direct message read access is not provided with xAuth.

xAuth provides a way for desktop and mobile applications to exchange a username and password for an OAuth access token. Once the access token is retrieved, the password corresponding to the user is disposed of by the mobile/desktop application. The username may also be disposed of by the mobile/desktop application. However, the username may be stored by the mobile/desktop application as will be explained in more detail in relation to S1403 of FIG. 14.

xAuth allows desktop and mobile applications to skip request_token and authorize, and jump right to access_token.

Client request to obtain an Access token

With reference to FIGS. 12 to 14, for purposes of illustration imagine a scenario in which a user walks up to the MFP 10 and wishes to access the MFP 10. When the user looks at the display unit 24 of the MFP 10, he or she sees a display corresponding to FIG. 12. The user uses the touch screen of the display unit 24 in order to select the 'Sign in with Twitter' icon 70. Touching the icon 70 on the touch screen causes the MEAP application, which is the login application, to change state in order to display a login screen, see S1401 in FIG. 14. The MEAP application is configured to support log-in using one or more service providers, e.g. social networking services such as Twitter, Facebook and Google+. The MEAP application prompts the user to enter their authentication credentials to the MEAP application using the operation unit 25, FIG. 13 and S1402 in FIG. 14. In this embodiment, as the user enters his/her username directly into the MEAP application (FIG. 13), the MEAP application may have previously stored the entered username in association with an access token for that particular user. In S1403 of FIG. 14, the MEAP application checks whether an access token for the particular user has been previously stored. If an access token has been previously stored, the flow in FIG. 14 skips to S1407. If an access token has not been previously stored for the particular user, the flow in FIG. 14 proceeds to S1404. In S1404 of FIG. 14, to request an Access Token for the browserless MEAP application, the MEAP application makes an SSL (HTTPS) request to the Service Provider's Access Token URL (e.g. Twitter Access Token URL https://api.twitter.com/oauth/access_token) with the MEAP application's consumer key. In addition to the conventional oauth_* signing parameters, the following post parameters must be submitted:

x_auth_username—the login credential of the User the client is obtaining a token on behalf of x_auth_password—the password credential of the User the client is obtaining a token on behalf of.

x_auth_mode—this value must be "client_auth" (referring to the process described here)

Response

To grant an access token, the Service Provider (e.g. social network provider such as Twitter) checks that:

The request signature has been successfully verified as defined by the OAuth specification.

A request with the supplied timestamp and nonce has never been received before.

The supplied username and password match a User's credentials.

If successful, the Service Provider (e.g. Twitter API) generates an Access Token and Token Secret and returns them in a HTTP response body, see S1405 in FIG. 14. The response contains the following parameters:

oauth_token—The Access Token.

oauth_oken secret—The Token Secret.

x_auth_expires—a timestamp, in seconds since 1970-01-01T00:00, at which the Access Token expires, or 0 if no expiry is specified.

Additional parameters—Any additional parameters, as defined by the Service Provider.

Accessing Protected Resources

After successfully receiving the Access Token and Token Secret, the MEAP application is able to access the Protected Resources on behalf of the User as per section 7 of the OAuth specification. In other words the Access Token obtained here is no different in capability to the Access Token specified by the OAuth specification. The obtained access token which is associated with a particular user may be stored (S1406 in FIG. 14) by the MEAP application so that the flow in FIG. 14 can skip from S1403 to S1407 when the particular user next accesses the MFP 10. Once authenticated using the above process, the MEAP application will sign all subsequent requests for the User's Protected Resources (User's Twitter ID) using the returned Token Secret (S1407 and S1408 in FIG. 14) which is also the case when using OAuth. In particular, the MEAP application uses the obtained access token to request the service provider's API (e.g. Twitter API) to provide the user's Twitter ID (username). Once the MEAP application has obtained the user's Twitter ID (S1408 in FIG. 14), in the background, the MFP list for the MFP 10 which is defined in Twitter by the administrator (as explained above with reference to FIGS. 3 to 7) is accessed and it is determined whether the user's Twitter ID is on the MFP list representing the MFP 10 which the user wishes to access, S1409 and S1410 in FIG. 14. If the user's Twitter ID is on the list then the user is granted access to the MFP 10. If the user's Twitter ID is not on the list then an error message is displayed on the MFP 10.

Third Example Embodiment

Figure 15:
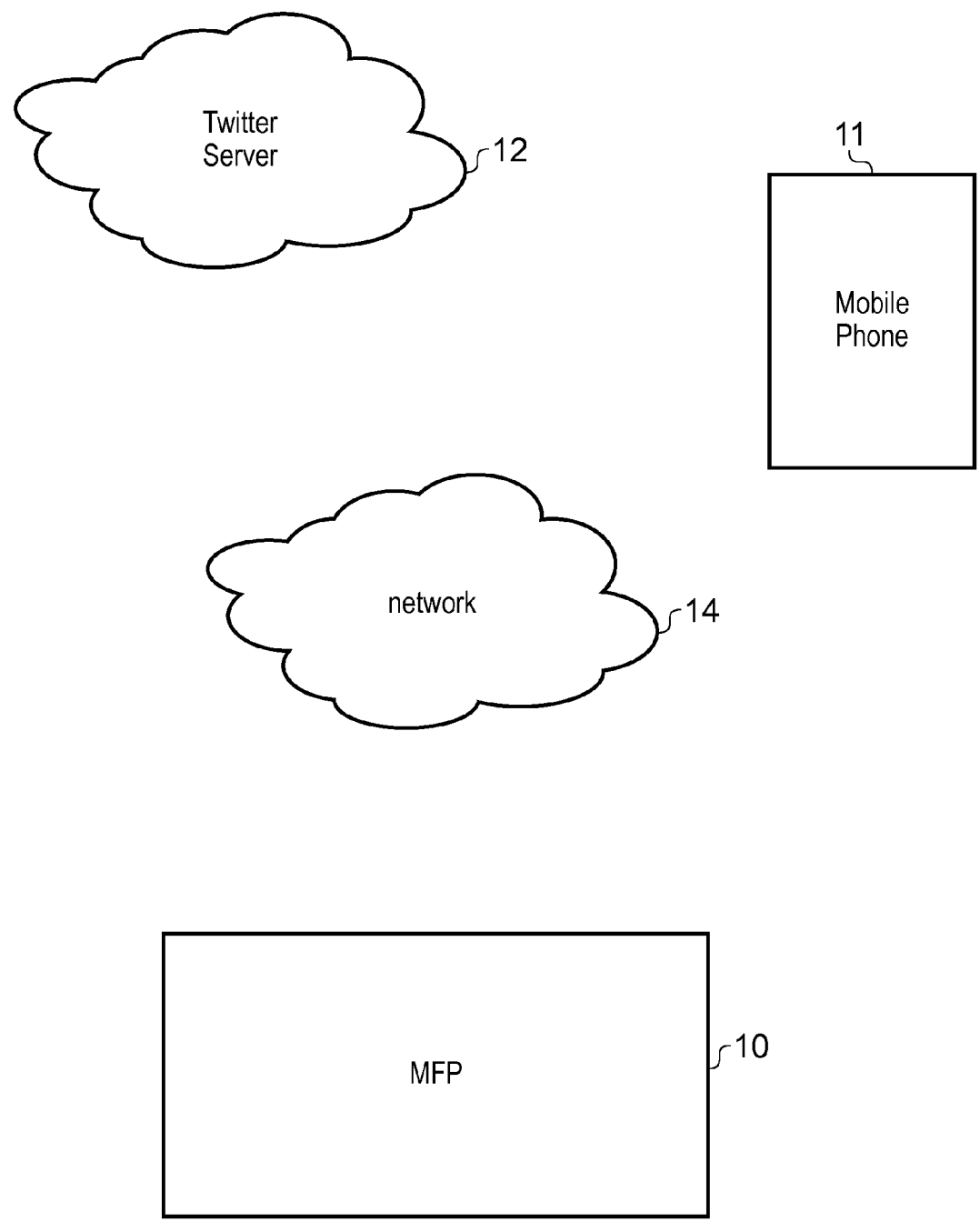
FIG. 15 shows a configuration of the third example embodiment.

FIG. 15 shows architecture of an image-processing system of the third example embodiment. The image-processing system comprises the MFP (multi-function peripheral) 10 and the authentication server 12 of the first and second example embodiments, and a mobile device, e.g. mobile phone 11. The MFP 10, the mobile phone 11 and the authentication server 12 are able to communicate with each other using a network, e.g. Wi-Fi network 14, and the internet.

Figure 16:
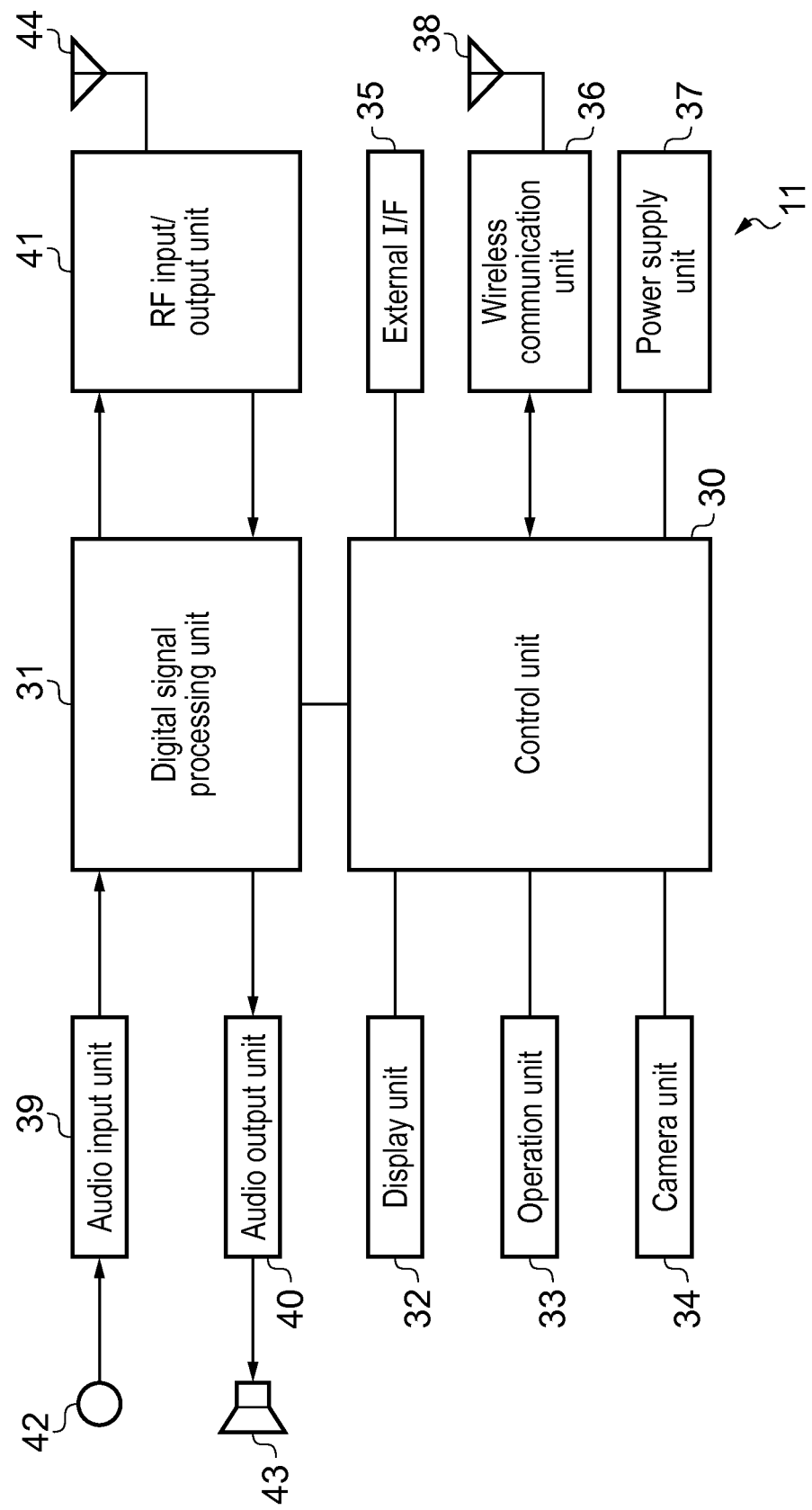
FIG. 16 shows an example of hardware configuration of a mobile phone.

FIG. 16 shows the hardware configuration of the mobile phone 11. The mobile phone 11 comprises a control unit 30 connected to a digital signal processing unit 31. The control unit 30 controls operation of a display unit 32, an operation unit 33, a camera unit 34, an external I/F 35, a wireless communication unit 36, and a power supply unit 37. The display unit 32 comprises an LCD display for displaying information to a user of the phone 11. The operation unit 33 comprises a keypad and other operation buttons to allow a user to make inputs into the mobile phone 11. The camera unit 34 is a camera that is integrated into the phone 11 to allow a user to take pictures and to collect visual information. The external I/F 35 is a port provided in the mobile phone 11 to allow the mobile phone 11 to communicate with other devices. In particular the external I/F 35 allows the mobile phone 11 to be connected to a computer for the purposes of synchronizing data (contact details, calendar entries etc.) stored on the mobile phone 11 with data stored on the computer. The wireless communication unit 36 provides support for various wireless services. In particular the wireless communication unit 36 provides support for Wi-Fi communication. The wireless communication unit 36 is connected to an antenna 38. The power supply unit 37 includes a battery and a mechanism for charging the battery from an external power supply.

The digital signal processing unit 31 is connected to an audio input unit 39, an audio output unit 40, and an RF input/output unit 41. The audio input unit 39 is an analogue to digital processor for receiving and converting audio signals from a microphone 42. The audio output unit 40 is a digital to analogue processor for receiving and converting digital signals into an analogue output to be output by a speaker 43. The RF input/output unit 41 is connected to an antenna 44 and is used to allow the mobile phone 11 to communicate with a local mobile phone station. The audio input unit 39, audio output unit 40, digital signal processing unit 31 and RF input/output unit 41 allow the mobile phone 11 to operate as a portable telephone.

The mobile phone 11 is a so called 'smart phone' and runs Google® Android® operating system. In other embodiments other types of phones can be used, including those running different mobile phone operating systems.

The description of the "SET UP OF LIST ON SERVICE PROVIDER" described above in relation to FIGS. 3 to 7 and the "GENERAL LOG-IN PROCEDURE" described above in relation to FIG. 8 is also applicable to this embodiment and therefore the description of these figures will not be repeated below for the third example embodiment. Please note that with respect to FIG. 8, in the third example embodiment, the received log-in details is a PIN code.

Access Using a Mobile Phone

Figure 17:
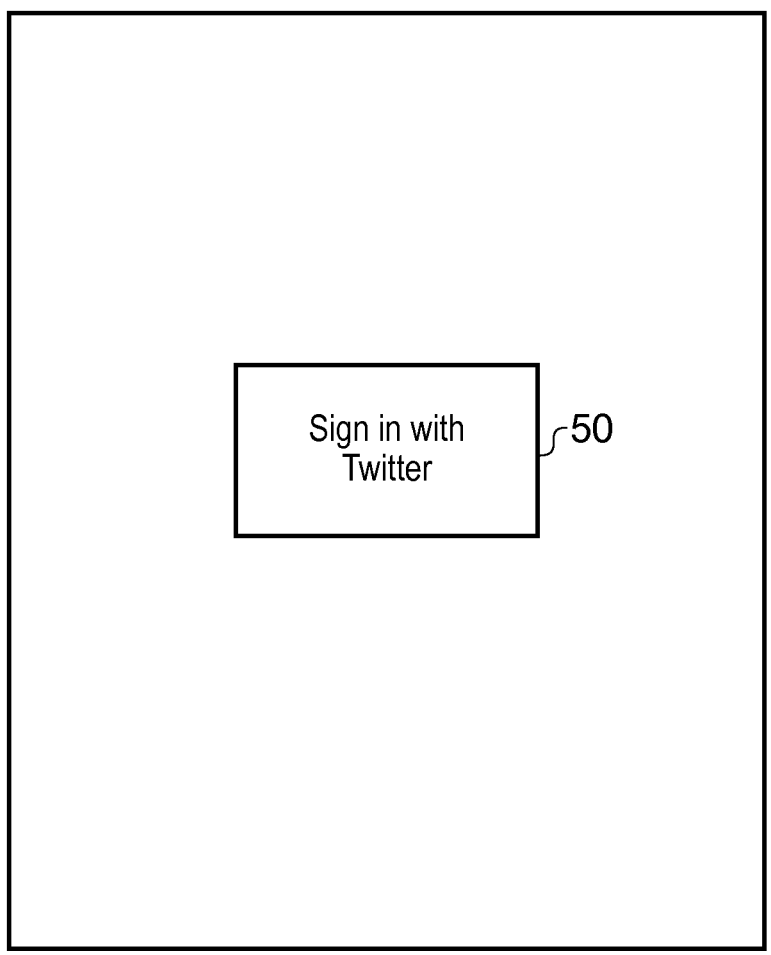
FIG. 17 shows another display of the MFP.
Figure 18:
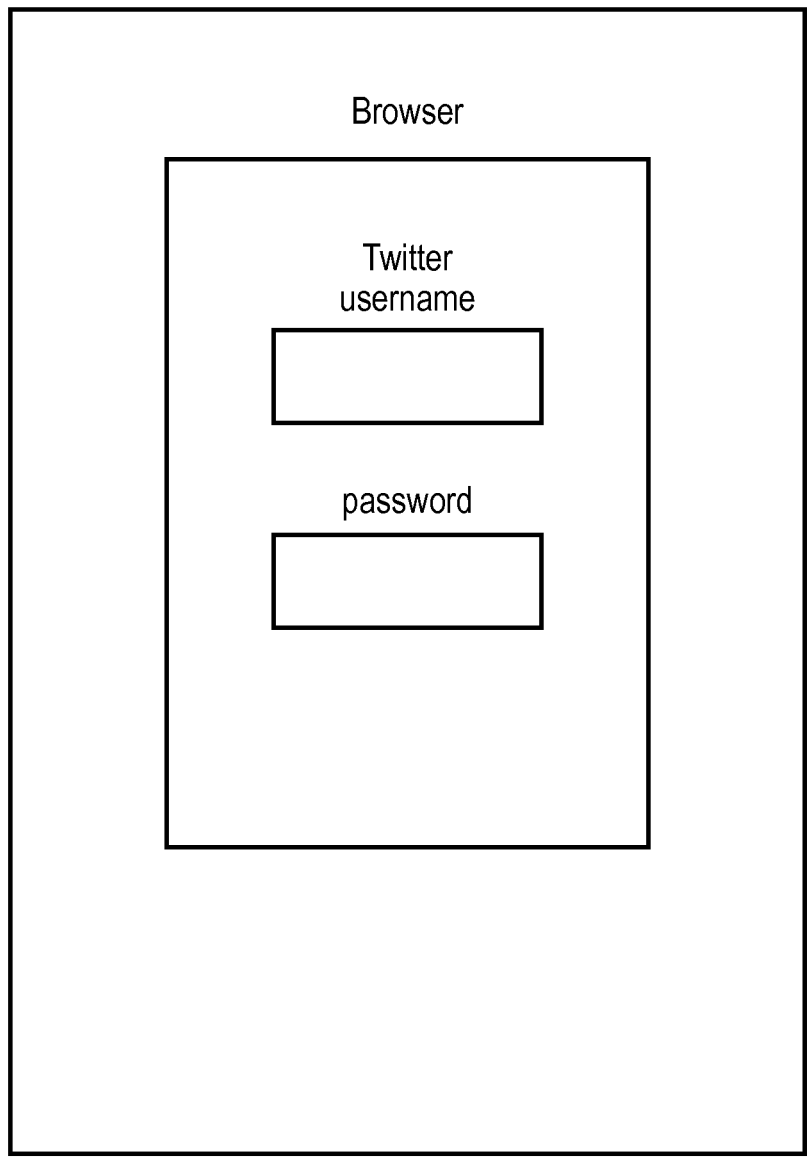
FIG. 18 shows an example display of the mobile phone.
Figure 19:
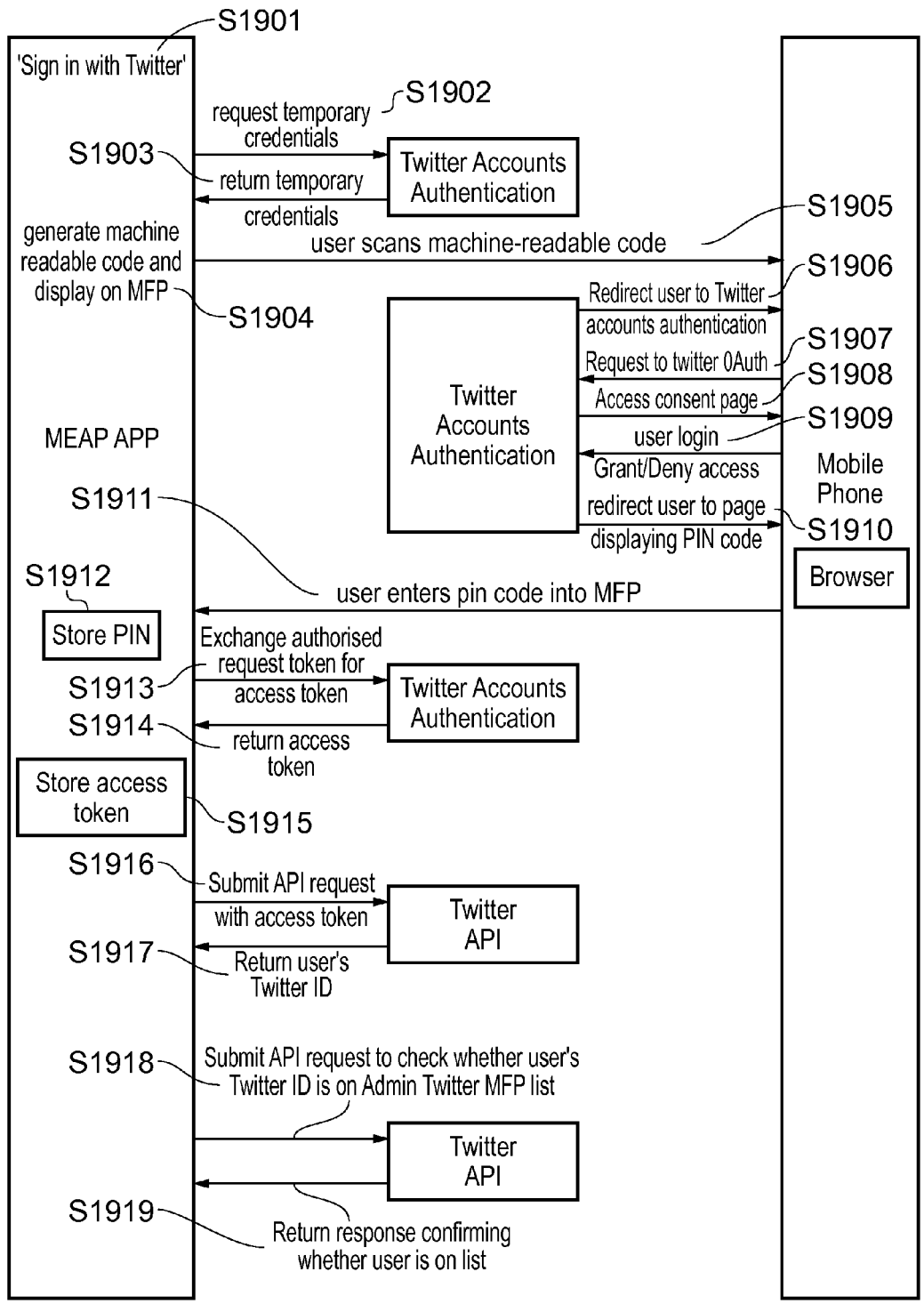
FIG. 19 shows a process performed according to the third example embodiment.

An alternative arrangement to that shown in FIGS. 9 to 11 and 12 to 14 will now be described with reference to FIGS. 17 to 19. FIGS. 17 to 19 illustrate a technique for allowing a user to provide their credentials using an OAuth mechanism in a case where the MEAP application running on the MFP 10 does not have any mechanism to invoke a web browser.

For purposes of illustration imagine a scenario in which a user holding the mobile phone 11 walks up to the MFP 10 and wishes to either scan or print using the MFP 10. When the user looks at the display unit 24 of the MFP 10, he or she sees a display corresponding to FIG. 17. The user uses the touch screen of the display unit 24 in order to select the 'Sign in with Twitter' icon 50. Touching the icon on the touch screen causes the MEAP application, which is the login application, to change state in order to display a login screen, see S1901 in FIG. 19.

The MEAP application is configured to allow log-in using one or more social networking services (e.g. Twitter). In order to do so, the MEAP application previously obtained a set of client credentials (client identifier and secret) from Twitter to be used with Twitter's OAuth-enabled API.

The MEAP application requests from Twitter a set of temporary credentials by submitting a signed request, including oauth_callback=oob as one of the request parameters, to obtain a request token from Twitter's OAuth authentication service, see S1902 in FIG. 19. At this point, the temporary credentials are not resource-owner-specific, and can be used by the MEAP application to gain resource owner approval from the user to access his/her Twitter account.

When the MEAP application receives the temporary credentials (request token), see S1903 in FIG. 19, it generates a link to Twitter's OAuth User Authorization URL, including the oauth_token parameter (corresponding to the request token). The MEAP application then embeds the link to Twitter's OAuth User Authorization URL in a machine-readable code or bar code (e.g. QR code) and displays the bar code on the display unit 24 of the MFP 10, see S1904 in FIG. 19.

The user holding the mobile phone 11 next scans (S1905 in FIG. 19) the machine-readable code displayed on the MFP 10 using a suitable application on the mobile phone which causes the web browser of the mobile phone 11 to be redirected to Twitter's OAuth User Authorization URL, S1906 and S1907 in FIG. 19, where the user is requested to sign into Twitter, FIG. 18 and S1908 and S1909 in FIG. 19. As before, OAuth requires that servers first authenticate the resource owner (user), and then request them to grant access to the client (e.g. the MEAP application).

The user can confirm that he/she is now at a Twitter web page by looking at the browser URL (FIG. 18), and enters his/her Twitter username and password, as in FIG. 18 and S1909 in FIG. 19.

OAuth allows the user to keep his/her username and password private and not share them with the MEAP application or any other site. At no time does the user enter his/her credentials into the MEAP application.

At the time of logging into Twitter or after successfully logging into Twitter, the user is asked to grant access to the MEAP application, the client. Twitter informs the user of who is requesting access (in this case the MEAP application) and the type of access being granted. The user may approve or deny access (S1909 in FIG. 19).

Once the user approves the request and if the entered credentials are valid, Twitter identifies (marks) the temporary credentials as resource-owner-authorized by the user. The browser on the mobile phone 11 is then redirected to a page displaying an oauth_verifier (e.g. PIN code) (S1910 in FIG. 19).

The user enters the PIN code into a screen of the MEAP application using the operation unit of the MFP 10 (S1911 in FIG. 19), the MEAP application may also collect and store the entered PIN code (S1912 in FIG. 19).

While the user waits, in the background, the MEAP application uses the Authorized Request Token, including the PIN code the user entered as the value for oauth_verifier, and exchanges it for an Access Token, see S1913 and 1914 in FIG. 19. Request Tokens are only good for obtaining User approval, while Access Tokens are used to access Protected Resources, in this case the user's Twitter ID. In the first request, the MEAP application exchanges the Request Token for an Access Token by submitting a signed request to Twitter's authentication service, see S1913 and S1914 in FIG. 19. The obtained access token which is associated with a particular user may be stored (S1915 in FIG. 19) so that, in the future, the MEAP application may use the same access token to make authenticated requests for the same user. In the second (can be multiple requests) request, the MEAP application obtains the user's Twitter ID, see 1916 and 1917 in FIG. 19. At the same time, in the background, the MFP list for the MFP 10 defined in Twitter by the administrator (as previously described with reference to FIGS. 3 to 7) is accessed and it is determined whether the user's Twitter ID is on the MFP list representing the MFP 10 which the user wishes to access, see 1918 and 1919 in FIG. 19. If the user's Twitter ID is on the list then the user is granted access to the MFP 10. If the user's Twitter ID is not on the list then an error message may be displayed on the MFP 10.

Oauth_callback is an optional parameter which, with respect to FIGS. 9 to 11, specifies the URL to which the user will be redirected after granting the MEAP application access to the user's Twitter account. With respect to FIGS. 17 to 19, the oauth_callback is set to oauth_callback=oob which cause a PIN code to be displayed on the MFP 10. However, it is possible to skip the PIN code display (S1910 in FIG. 19) by not setting the oauth_callback parameter. Therefore after the user successfully completes the login process (S1909 in FIG. 19), the flow can skip straight to S1913 where the request token is exchanged for an access token.

Fourth Example Embodiment

The description of the "SET UP OF LIST ON SERVICE PROVIDER" described above in relation to FIGS. 3 to 7 and the "GENERAL LOG-IN PROCEDURE" described above in relation to FIG. 8 is also applicable to this embodiment and therefore this description will not be repeated below for the fourth example embodiment.

Figures 20A, 20B:
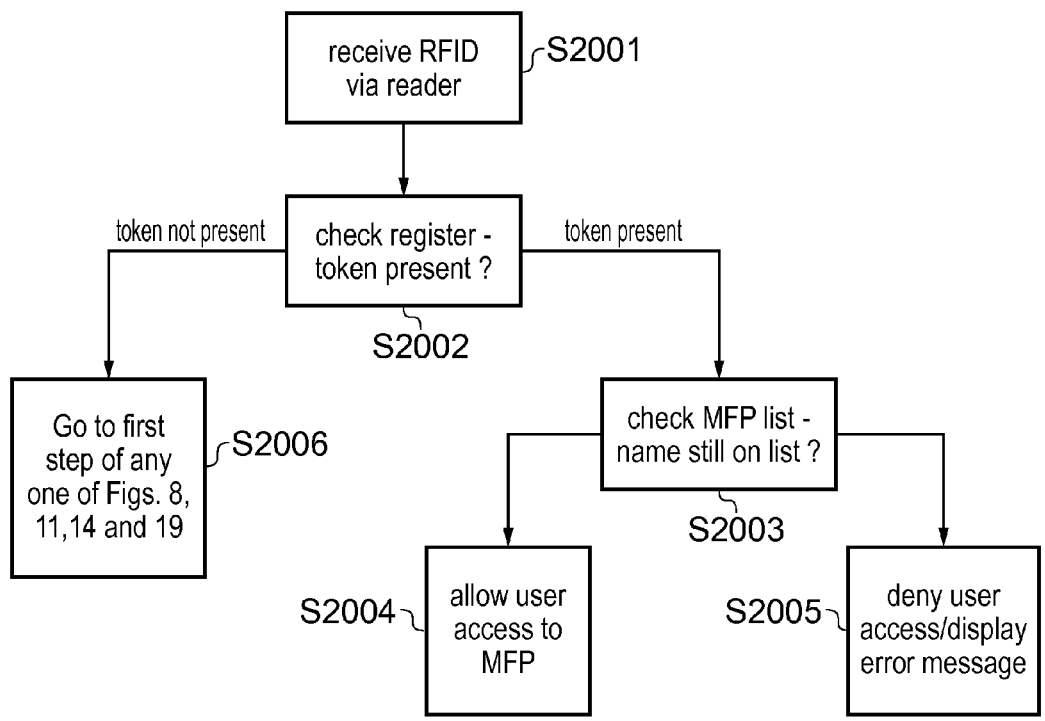
FIG. 20A shows a register for storing a user RFID in association with an access token.
FIG. 20B shows a process performed at the MFP according to the fourth example embodiment.

With reference to FIGS. 20A and 20B, for purposes of illustration imagine a scenario in which a user walks up to the MFP 10 and wishes to access the MFP 10. In this embodiment, the user uses an RFID card or an RFID tag (e.g. attached to the mobile phone 11) to access the MFP 10. When the user touches their RFID card or RFID tag on the card reader 212, the MEAP application, which is the login application, changes state in order to display a login screen on the MFP 10. The MEAP application maintains a register of users who have previously accessed the MFP 10 and determines based on the received RFID ID whether an access token has been previously stored for a particular user (see FIG. 20A).

In S2001 of FIG. 20B, the MEAP application receives the RFID via the card reader 212. In S2002 of FIG. 20B, the MEAP application determines whether an access token corresponding to the received RFID exists in the register maintained by the MEAP application.

If an access token exists for the received RFID, the flow in FIG. 20B proceeds to S2003. In S2003, the MFP list for the MFP 10 defined in Twitter by the administrator (as previously described with reference to FIGS. 3 to 7) is accessed and it is determined whether the user's Twitter ID is on the MFP list representing the MFP 10 which the user wishes to access.

If the user's Twitter ID is on the list then the user is granted access to the MFP (S2004 in FIG. 20B). If the user's Twitter ID is not on the list then an error message may be displayed on the MFP 10 (S2005). S2003, S2004, and S2005 correspond to S1114 to S1117 in FIG. 11, S1407 to S1410 in FIG. 14 and S1916 to S1919 in FIG. 19.

In S2002 of FIG. 20B, if it is determined that an access token does not exist for the received RFID, the flow in FIG. 20B proceeds to S2006. In S2006, the access token can be obtained by following any one of the previously explained flow diagrams in FIGS. 8, 11, 14 and 19. Once the access token has been received by the MEAP application, the MEAP application stores the RFID of the particular user and the corresponding access token in the register (FIG. 20A).

Fifth Example Embodiment

The architecture of the image-processing apparatus (FIG. 15) and the hardware configuration of the mobile phone (FIG. 16) described in the third example embodiment is also applicable to this embodiment and therefore the description of these figures will not be repeated in this embodiment. The description of the "SET UP OF LIST ON SERVICE PROVIDER" described above in relation to FIGS. 3 to 7 is also applicable to this embodiment and therefore the description of these figures will not be repeated in this embodiment. The "Access Using a Mobile Phone" in the fifth example embodiment is carried out as follows.

Figure 21:
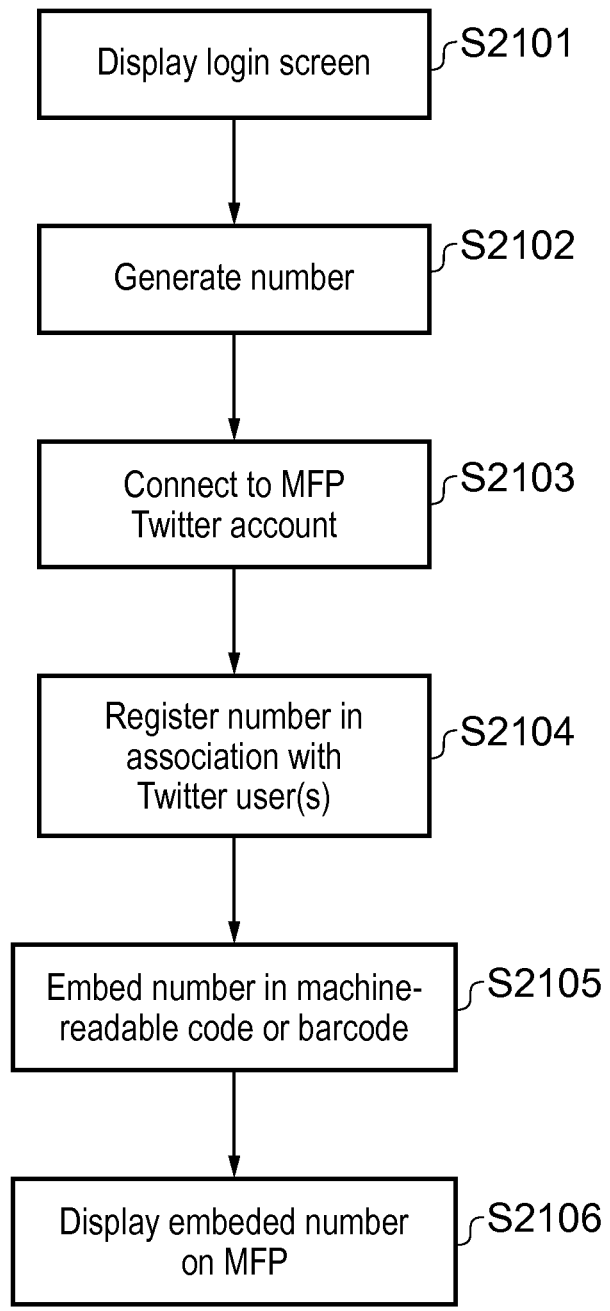
FIG. 21 shows a process performed at the MFP according to the fifth example embodiment.

For purposes of illustration imagine a scenario in which a user holding the mobile phone 11 walks up to the MFP 10 and wishes to either scan or print using the MFP 10. When the user looks at the display unit 24 of the MFP 10, he or she sees a display corresponding to FIG. 17. The user uses the touch screen of the display unit 24 in order to select the 'Sign in with Twitter' icon 50. Touching the icon on the touch screen causes the MEAP application, which is the login application, to change state in order to display a login screen on the MFP 10, see S2101 in FIG. 21.

The MEAP application is configured to allow log-in using one or more social networking services (e.g. Twitter). In order to do so, an administrator has previously created a social networking service account (e.g. a Twitter account) for the MFP 10. The MEAP application running on the MFP 10 is configured to generate a random number using a random or pseudo-random number generator, see S2102 in FIG. 21. The MEAP application connects to the MFP's Twitter account (S2103 in FIG. 21) and registers the random number in association with one or more users of the social networking service (S2104 in FIG. 21). For example, the random number could be associated (linked) to the lists of users described above in relation to FIGS. 3 to 7. The MEAP application is configured to embed the random number and information identifying the MFP's Twitter account (username) in a machine-readable code or bar code (e.g. QR code), S2105 in FIG. 21, and displays the machine-readable code or bar code on the display unit 24 of the MFP 10, S2106 in FIG. 21.

Figure 22:
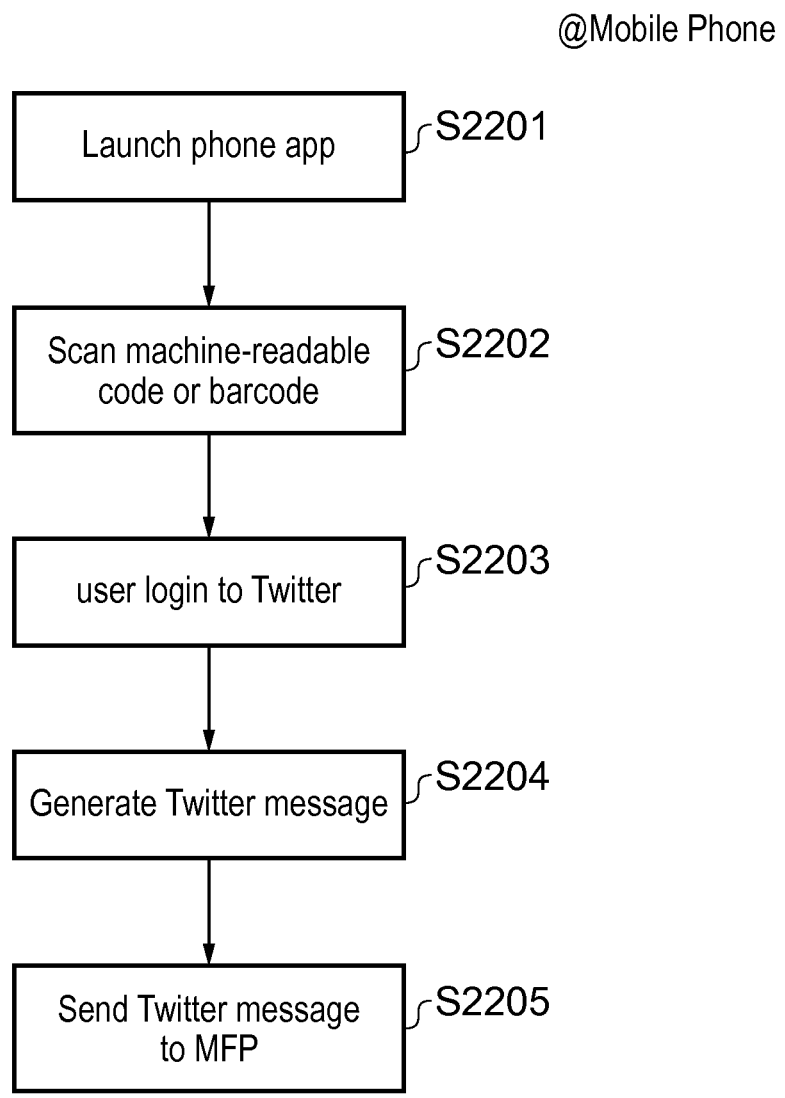
FIG. 22 shows a process performed at the mobile phone according to the fifth example embodiment.
Figure 23:
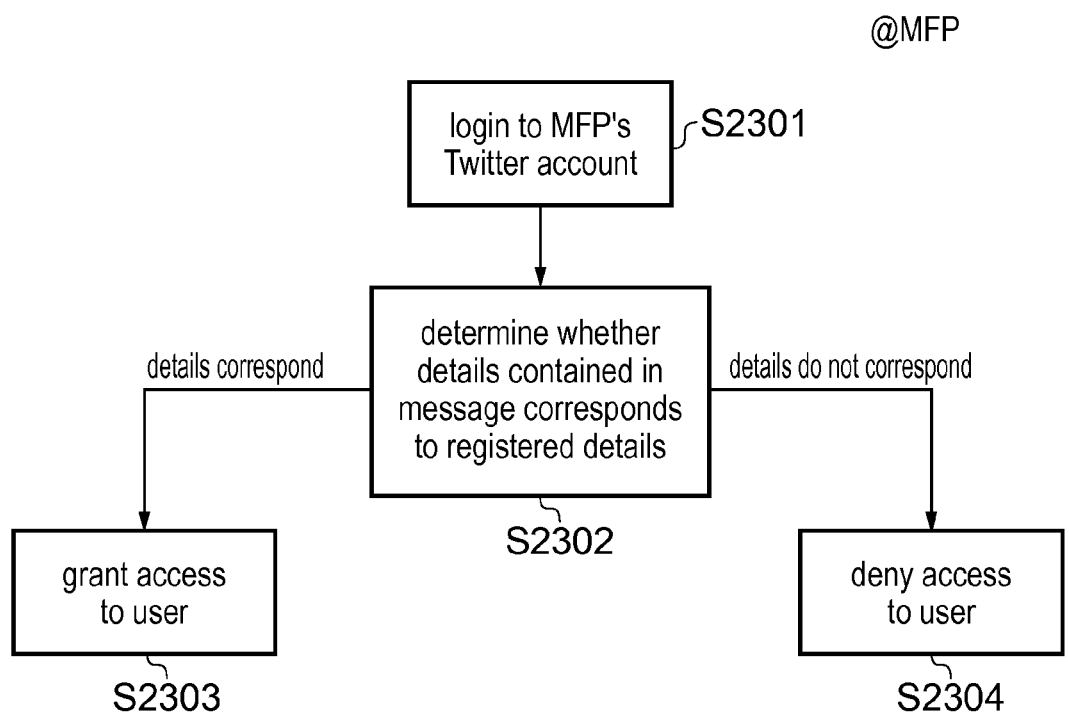
FIG. 23 shows a process performed at the MFP according to the fifth example embodiment.

The user holding the mobile phone 11 next launches on the mobile phone 11 an application for authenticating the user at the peripheral apparatus (S2201 in FIG. 22). The application on the mobile phone 11 is used to scan the machine-readable code or bar code displayed on the MFP 10, S2202 in FIG. 22, and the application is configured to automatically log-in the user to their Twitter account, S2203 in FIG. 22. The application is then configured to generate a message comprising the identification code displayed on the peripheral apparatus and information identifying the user's social networking account, S2204 in FIG. 22. The application then sends a direct message or tweet which can be viewed by the MEAP application using the MFP's Twitter account, S2205 in FIG. 22. The message can be sent directly (direct message, i.e. privately) to the MFP's Twitter account (inbox) or it can be posted to a location that is accessible to multiple users of Twitter. For example, a tweet can be sent (posted) to the user's followers. Of course, the log-in to Twitter, the generation of the message, and the sending of the message can be performed manually by the user. The MEAP application running on the MFP 10 is configured to retrieve the message from Twitter by logging-in to the MFP's Twitter account, S2301 in FIG. 23. The MEAP application is configured to determine whether the details contained in the message correspond to the details registered (see S2104 in FIG. 21) in the MFP's social networking account, S2302 in FIG. 23). For example, the MEAP application determines whether the user ID and random number contained in the message corresponds to the number and user ID registered in the MFP's Twitter account. If the details correspond, the MFP 10 grants access to the user, S2303 in FIG. 23. The MEAP application can grant different levels of access to different users based on the user's social networking service account information. For example, username1 can be assigned copy and scan permission and username2 can be assigned copy only permission. Of course, if the details received in the message do not match the details registered in the Twitter account then the MFP 10 does not grant access to the user, S2304 in FIG. 23.

In an alternative embodiment, the identification information is generated based on GPS co-ordinates of the MFP 10. The MFP 10 registers a predetermined number of the GPS coordinates of the MFP as part of the first piece of identification information registered on the social networking service (e.g. Twitter). In a case that a user wishes to access the MFP 10, the user places the mobile phone 11 on the MFP 10 and opens a predetermined application on the mobile phone 11. The predetermined application accesses a GPS unit on the mobile phone 11 and identifies GPS coordinates identifying the mobile phone's position (alternatively the mobile phone can read the GPS coordinates from the display of the MFP). The application on the mobile phone 11 selects a predetermined number of GPS coordinates and uses these coordinates as identification information in the message to be sent to the MFP 10. As the mobile phone 11 and the MFP 10 are in the same location (the mobile phone 11 is resting on the MFP 10) the first piece of identification information registered for the MFP 10 matches the identification information generated by the mobile phone 11, and if the user's Twitter ID (which is also contained in the message sent from the mobile phone to the MFP 10) is associated with the registered GPS coordinates for the MFP 10 on Twitter then the user is allowed access to the MFP 10.

Sixth Example Embodiment

Figure 24:
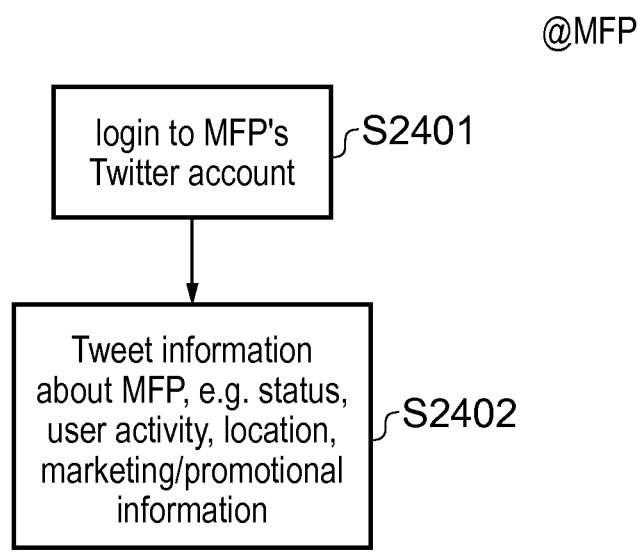
FIG. 24 shows a process performed at the MFP according to the sixth example embodiment.

In this embodiment, an administrator sets up a social networking service account (e.g. Twitter) for the MFP 10. The MEAP application running on the MFP 10 is configured to connect to the MFP's social networking service account, S2401 in FIG. 24, and to send information concerning the operation of the MFP 10 to users of the social networking service, S2402 in FIG. 24. For example, the MFP 10 has a Twitter account. Interested users would 'follow' the MFP 10—typically these would be administration type users. The MFP 10 could then be configured to tweet information about its status, for example, out of media, paper jams and other errors, or information about its usage, for example, identifying a user of the MFP 10, detailing cost to the user for using the MFP 10, information concerning the location of the peripheral apparatus, information concerning overall or individual user activity of the peripheral apparatus, information detailing materials (e.g. type of paper) used by the peripheral apparatus to process user actions, and service information (e.g. request for service).

Seventh Example Embodiment

This embodiment is a variation of the sixth example embodiment. In this embodiment, the MFP 10 is configured to use its social networking service account to send fellow users of the social networking service information about a user's activity. For example, assuming that the MFP 10 has a Twitter account, the MEAP application can be configured to tweet about a user's activity perhaps as a marketing tool to broadcast promotional information, e.g. '@JoeBloggs just copied 15 pages in glorious Canon colour! Choose Canon!'. In this case the MEAP application in the MFP 10 will be tweeting using the user's Twitter account, the user would need to grant access to allow this. This could happen during the previously discussed OAuth/xAuth login process. Alternatively the MFP 10 tweets using its own account and mentions the user's twitter account in the tweet.

Embodiments of the present subject matter have been described above. Further embodiments of the present subject matter can also be realized by systems that read out and execute programs recorded on a memory device to perform the functions of the above-described embodiment(s), and by a method, performed by, for example, reading out and executing a program recorded on a memory device to perform the functions of the above-described embodiment(s). For this purpose, the program(s) may be provided to the peripheral apparatus, mobile device and image-processing system, for example via a network or from a recording medium of various types serving as the memory device (e.g., computer-readable medium).

The invention claimed is:

1. A method of authenticating a user at a peripheral apparatus, comprising the peripheral apparatus:
receiving a log-in request from a user;
sending a request to a social networking service to authenticate a social networking service account of the user;
receiving social networking service account information of the user from the social networking service;
determining based on the user's social networking service account information whether the user is authorised to access the peripheral apparatus by connecting to an administrator's social networking service account on the social networking service and determining whether or not the user's social networking service account information is associated with a list on the social networking service; and
allowing, in a case that the determining determines that the user is authorised to access the peripheral apparatus, the user access to the peripheral apparatus.

2. The method according to claim 1, wherein the peripheral apparatus is represented on the social networking service by association with one or more lists of members of the social networking service on the social networking service.

3. The method according to claim 2, wherein associating the representation of the peripheral apparatus on the social networking service with the one or more lists of members of the social networking service comprises defining levels of access to functions of the peripheral apparatus for the one or more lists of members of the social networking service.

4. The method according to claim 1, wherein the sending of the request to the social networking service comprises requesting an access token from the social networking service.

5. The method according to claim 4, wherein the determining comprises using the access token to obtain a social networking service username of the user and determining whether the username is associated with a representation of the peripheral apparatus on the social networking service.

6. The method according to claim 4, further comprising storing the access token on the peripheral apparatus in association with information identifying the user.

7. The method according to claim 6, wherein the storing comprises storing the access token in association with an RFID of the user.

8. The method according to claim 6, wherein the stored access token is for making repeated log-in requests on behalf of the user.

9. The method according to claim 4, wherein the requesting of the access token from the social networking service comprises using an OAuth or a xAuth authentication process.

10. The method according to claim 1, wherein the peripheral apparatus comprises a peripheral device which functions as at least one of a printer, a fax machine, or a scanner.

11. The method according to claim 1, wherein the sending of the request to the social networking service is preceded by a mobile device determining a first piece of information provided by the peripheral apparatus.

12. The method according to claim 11, wherein the first piece of information is a URL,
wherein the peripheral apparatus provides the URL to the user, and
wherein the mobile device determines the URL by entry of the URL into the mobile device by the user.

13. The method according to claim 12, wherein the URL received by the mobile device allows the user to log-in to the social networking service.

14. The method according to claim 12, wherein the URL received by the mobile device allows the user to log-in to the social networking service and authorise issue of an access token to the peripheral apparatus.

15. The method according to claim 11, wherein the peripheral apparatus provides a machine-readable code encoding the first piece of information, and
wherein the mobile device determines the first piece of information by reading and decoding the machine-readable code provided by the peripheral apparatus.

16. The method according to claim 11, wherein the sending of the request to the social networking service to authenticate the user is followed by the mobile device determining a second piece of information provided by the social networking service.

17. The method according to claim 16, wherein the second piece of information is a code and the method comprises the peripheral apparatus receiving the code from the user via a user interface of the peripheral apparatus.

18. The method according to claim 15, wherein the machine-readable code is a bar code or a QR code.

19. A non-transitory storage medium storing instructions that, when executed by a central processing unit of a peripheral apparatus, causes the peripheral apparatus to perform an authentication method comprising:
receiving a log-in request from a user;
sending a request to a social networking service to authenticate a social networking service account of the user;
receiving social networking service account information of the user from the social networking service;
determining based on the user's social networking service account information whether the user is authorised to access the peripheral apparatus by connecting to an administrator's social networking service account on the social networking service and determining whether or not the user's social networking service account information is associated with a list on the social networking service; and
allowing, in a case that the determining determines that the user is authorised to access the peripheral apparatus, the user access to the peripheral apparatus.

20. A peripheral apparatus comprising:
a central processing unit and a memory storing instructions for execution by the central processing unit, the central processing unit operable when executing the instructions to
receive a log-in request from a user;
send a request to a social networking service to authenticate a social networking service account of the user;
receive social networking service account information of the user from the social networking service;
determine based on the user's social networking service account information whether the user is authorised to access the peripheral apparatus by connecting to an administrator's social networking service account on the social networking service and determining whether or not the user's social networking service account information is associated with a list on the social networking service; and
allow, in a case that the peripheral apparatus determines that the user is authorised to access the peripheral apparatus, the user access to the peripheral apparatus.

21. The peripheral apparatus according to claim 20, further comprising a peripheral device which functions as at least one of a printer, a fax machine, or a scanner.

22. A system for authenticating a user of a peripheral apparatus, the system comprising:
a server executing a social networking service; and
a peripheral apparatus configured to receive a first request that is a log-in request from the user and to send a second request to the social networking service to authenticate a social networking service account of the user, the social networking service configured to receive the second request and to send social networking service account information of the user to the peripheral apparatus,
wherein the peripheral apparatus is configured to:
receive the social networking service account information of the user from the social networking service,
determine based on the user's social networking service account information whether the user is authorised to access the peripheral apparatus by connecting to an administrator's social networking service account on the social networking service and determining whether or not the user's social networking service account information is associated with a list on the social networking service, and
allow, in a case that the peripheral apparatus determines that the user is authorised to access the peripheral apparatus, the user access to the peripheral apparatus.

23. A method of authenticating a user at a peripheral apparatus comprising:
a mobile device determining a first piece of identification information and sending an access request to the peripheral apparatus via a social networking service, the access request comprising the determined first piece of identification information and a second piece of information identifying a social networking service account of the user;
the peripheral apparatus receiving the access request via the social networking service and determining based on access request information of the access request whether the user is authorised to access the peripheral apparatus by connecting to an administrator's social networking service account on the social networking service and determining whether or not the user's social networking service account information is associated with a list on the social networking service; and
in a case that the peripheral apparatus determines that the user is authorised to access the peripheral apparatus, the peripheral apparatus allowing the user access to the peripheral apparatus.

24. The method according to claim 23, wherein the determining by the peripheral apparatus is preceded by the peripheral apparatus connecting to the administrator's social networking service account and registering the first piece of identification information in association with a representation of the peripheral apparatus on the social networking service, and
wherein the determining by the peripheral apparatus comprises: connecting to the administrator's social networking service account, accessing the access request, and determining whether the information in the access request corresponds to registered details of the peripheral apparatus.

25. The method according to claim 24, wherein the access request is a direct message sent from the user's social networking service account to the administrator's social networking service account.

26. The method according to claim 23, wherein the peripheral apparatus determines a level of access to the peripheral apparatus based on the second piece of information identifying the user's social networking service account.

27. The method according to claim 23, wherein:
the first piece of identification information comprises a code,
the peripheral apparatus provides the code to the user, and
the mobile device determines the first piece of identification information by entry of the code into the mobile device by the user.

28. The method according to claim 23,
wherein the peripheral apparatus provides a machine-readable code encoding the first piece of identification information, and
wherein the mobile device determines the first piece of identification information by reading and decoding the machine-readable code provided by the peripheral apparatus.

29. The method according to claim 23, wherein the first piece of identification information comprises a random number.

30. The method according to claim 23, wherein the first piece of identification information comprises a piece of information identifying the administrator's social networking service account.

31. The method according to claim 23, wherein the peripheral apparatus is configured to generate the first piece of identification information.

32. The method according to claim 23,
wherein the first piece of identification information is derivable from a position of the peripheral apparatus, and
wherein the mobile device determines the first piece of identification information by detecting the position of the peripheral apparatus.

33. A system for authenticating a user at a peripheral apparatus, the system comprising:
a mobile device configured to determine a first piece of identification information and to send an access request to the peripheral apparatus via a social networking service, the access request comprising the determined first piece of identification information and a second piece of information identifying a social service networking account of the user;
the peripheral apparatus configured to receive the access request and to determine based on access request information of the access request whether the user is authorised to access the peripheral apparatus by connecting to an administrator's social networking service account on the social networking service and determining whether or not the user's social networking service account information is associated with a list on the social networking service, and
wherein the peripheral apparatus is configured, in a case that the peripheral apparatus determines that the user is authorised to access the peripheral apparatus, to allow the user access to the peripheral apparatus.

\* \* \* \* \*